(12) United States Patent
Kotani et al.

(10) Patent No.: US 8,953,046 B2
(45) Date of Patent: Feb. 10, 2015

(54) INFORMATION PROCESSING APPARATUS FOR SELECTING A CAMERA TO BE USED TO GENERATE A VIRTUAL VIEWPOINT VIDEO FROM IMAGES SHOT BY A PLURALITY OF CAMERAS

(75) Inventors: Takuya Kotani, Kawasaki (JP); Kazuhiro Yahata, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 13/082,739

(22) Filed: Apr. 8, 2011

(65) Prior Publication Data
US 2011/0254958 A1    Oct. 20, 2011

(30) Foreign Application Priority Data

Apr. 16, 2010 (JP) ................... 2010-095094

(51) Int. Cl.
*H04N 7/18* (2006.01)
*G06T 15/20* (2011.01)

(52) U.S. Cl.
CPC .............. *G06T 15/205* (2013.01); *H04N 7/181* (2013.01)
USPC ....................................................... 348/159

(58) Field of Classification Search
CPC ................................................... H04N 7/181
USPC ........................................................ 348/159
See application file for complete search history.

(56) References Cited

U.S. PATENT DOCUMENTS

| 6,014,163 | A | * | 1/2000 | Houskeeper | 348/47 |
| 2002/0015522 | A1 | * | 2/2002 | Rogina et al. | 382/154 |
| 2002/0110275 | A1 | * | 8/2002 | Rogina et al. | 382/154 |
| 2004/0247174 | A1 | * | 12/2004 | Lyons et al. | 382/154 |
| 2006/0181610 | A1 | * | 8/2006 | Carlsson et al. | 348/159 |

FOREIGN PATENT DOCUMENTS

| JP | 2004-088247 A | 3/2004 |
| JP | 2008-217243 A | 9/2008 |

* cited by examiner

*Primary Examiner* — Sath V Perungavoor
*Assistant Examiner* — James Pontius
(74) *Attorney, Agent, or Firm* — Canon U.S.A., Inc. IP Division

(57) ABSTRACT

An information processing apparatus acquires virtual viewpoint information of a plurality of frames contained in a virtual viewpoint video, selects a camera for shooting an image to be used in generating an image at a virtual viewpoint in a frame from a plurality of cameras with respect to each of the plurality of the frames based on a positional relationship between the virtual viewpoint information of each frame and viewpoint information of the plurality of the cameras, and reselects the camera selected for each of the plurality of the frames.

5 Claims, 28 Drawing Sheets

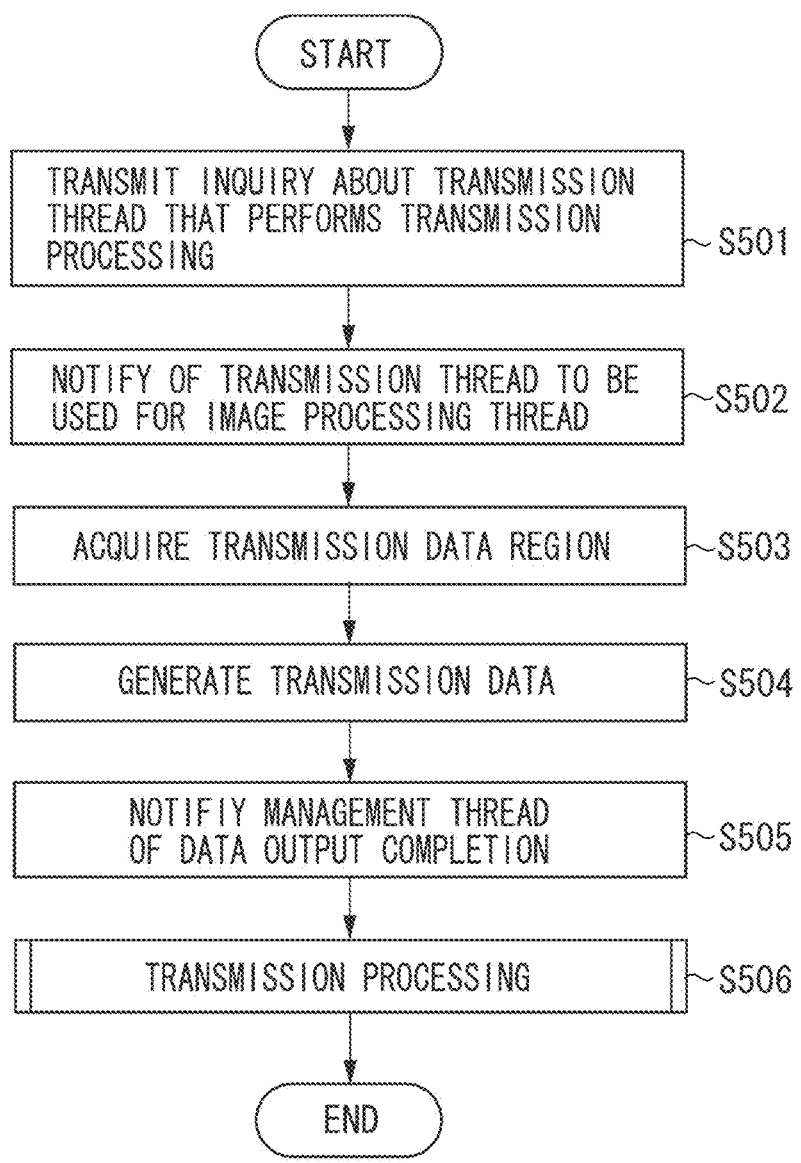

FIG. 6A

| SCENARIO PARAMETER / SCREEN TIME | VIRTUAL VIEWPOINT COORDINATES | | | VIRTUAL VIEWPOINT DIRECTION | | | VIRTUAL VIEWPOINT UPPER DIRECTION VECTOR | | | ANGLE OF VIEW (°) | HEIGHT OF REFERENCE PLANE | INTENSITY OF DISTORTION α | INTENSITY OF DECREASE IN MARGINAL ILLUMINATION β |
|---|---|---|---|---|---|---|---|---|---|---|---|---|---|
| 0:00:00.00f | 3.8 | 0.0 | 5.0 | 1.0 | 0.0 | 0.0 | 0.0 | 0.0 | 1.0 | 128.0 | 0.00 | 0.20 | 0.50 |
| 0:00:00.01f | 3.9 | 0.0 | 5.0 | 1.0 | 0.0 | 0.0 | 0.0 | 0.0 | 1.0 | 127.8 | 0.00 | 0.19 | 0.48 |
| ... | | | | | | | | | | | | | |
| 0:04:59.29f | 9.8 | 4.7 | 6.8 | -1.0 | 0.0 | 0.0 | 0.0 | 0.0 | 1.0 | 176.3 | 0.00 | 0.30 | 0.30 |

FIG. 6B

| SCREEN TIME / CAMERA ID | 0 | 1 | 2 | 3 | 4 | 5 | 6 | ... | n-3 | n-2 | n-1 |
|---|---|---|---|---|---|---|---|---|---|---|---|
| 0:00:00.00f | 1 | 2 | 0 | 0 | 0 | 0 | 0 | | 0 | 0 | 0 |
| 0:00:00.01f | 1 | 2 | 0 | 0 | 0 | 0 | 0 | | 0 | 0 | 0 |
| 0:00:00.02f | 1 | 2 | 0 | 0 | 0 | 0 | 0 | | 0 | 0 | 0 |
| 0:00:00.03f | 0 | 1 | 2 | 0 | 0 | 0 | 0 | | 0 | 0 | 0 |
| ... | | | | | | | | | | | |
| 0:04:59.27f | 0 | 0 | 0 | 0 | 0 | 0 | 0 | | 1 | 2 | 0 |
| 0:04:59.28f | 0 | 0 | 0 | 0 | 0 | 0 | 0 | | 0 | 1 | 2 |
| 0:04:59.29f | 0 | 0 | 0 | 0 | 0 | 0 | 0 | | 0 | 1 | 2 |

FIG. 6C

| SCREEN TIME | IMAGE PROCESSING PC ID | | | | | | | | | |
|---|---|---|---|---|---|---|---|---|---|---|
| | 0 | 1 | 2 | 3 | 4 | 5 | 6 | 7 | 8 | 9 |
| 0:00:00.00f | 1 | 0 | 0 | 0 | 0 | 0 | 0 | 0 | 0 | 0 |
| 0:00:00.01f | 0 | 1 | 0 | 0 | 0 | 0 | 0 | 0 | 0 | 0 |
| 0:00:00.02f | 0 | 0 | 1 | 0 | 0 | 0 | 0 | 0 | 0 | 0 |
| 0:00:00.03f | 0 | 0 | 0 | 1 | 0 | 0 | 0 | 0 | 0 | 0 |
| ... | | | | | | | | | | |
| 0:04:59.27f | 0 | 0 | 0 | 0 | 0 | 0 | 1 | 0 | 0 | 0 |
| 0:04:59.28f | 0 | 0 | 0 | 0 | 0 | 0 | 0 | 1 | 0 | 0 |
| 0:04:59.29f | 0 | 0 | 0 | 0 | 0 | 0 | 0 | 0 | 1 | 0 |

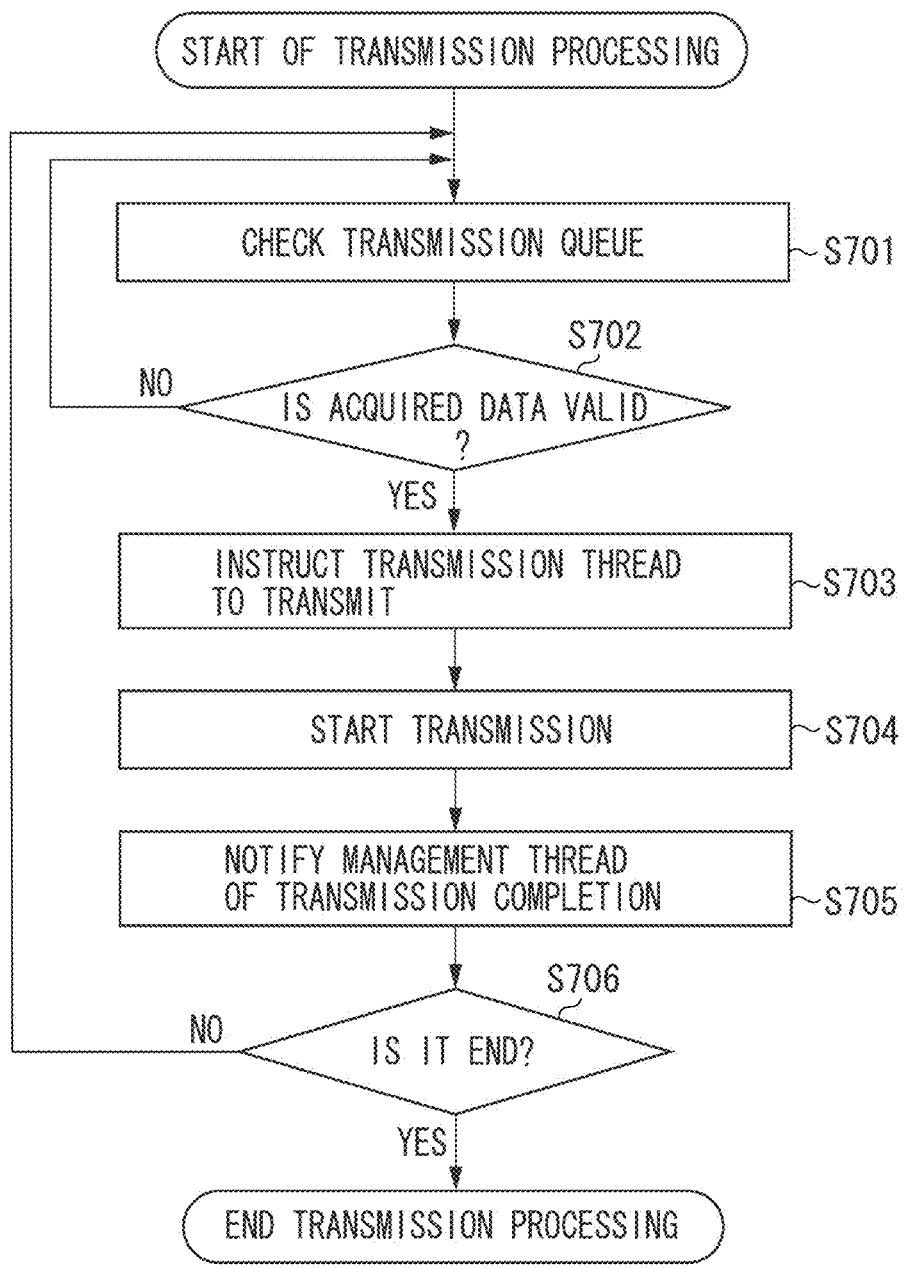

INFORMATION PROCESSING APPARATUS FOR SELECTING A CAMERA TO BE USED TO GENERATE A VIRTUAL VIEWPOINT VIDEO FROM IMAGES SHOT BY A PLURALITY OF CAMERAS

BACKGROUND OF THE INVENTION

1. Field of the Invention

The present invention relates to selecting a camera to be used to generate a virtual viewpoint video from images shot by a plurality of cameras.

2. Description of the Related Art

In Japanese Patent Application Laid-Open No. 2004-088247, a system for shooting the same scene by a plurality of cameras and expressing a video (free viewpoint image) viewed from moving virtual viewpoints is discussed. The simplest method for realizing such a system is to install a plurality of cameras and continuously reproducing a video by switching the videos of each camera. In such an image reproduction apparatus, different brightness and tints between the cameras are adjusted to reproduce a smooth video.

Moreover, Japanese Patent Application Laid-Open No. 2008-217243 discusses image processing for enhancing the continuity of video by using not only a video shot by a real camera but also using a virtual viewpoint video generated by assuming a virtual camera between cameras.

SUMMARY OF THE INVENTION

However, in such system, the number of cameras to be used is large. Then, it is difficult to operate all of the equipment for a long time without problems. For example, in the method discussed in Japanese Patent Application Laid-Open No. 2008-217243, when camera viewpoints used for generating a virtual viewpoint video largely vary due to failure of the camera, or the like, a correct video cannot be estimated. Then, a discontinuous video may be generated.

Accordingly, it is required to provide a function for automatically selecting another camera according to a virtual viewpoint when a camera failure occurred. Moreover, if it is possible to automatically select a camera for generating a virtual viewpoint image of each frame in a virtual viewpoint video, the load on a user for selecting the camera can be reduced.

The present invention is directed to automatically and appropriately selecting a camera for shooting an image to be used in each of a plurality of frames contained in a virtual viewpoint video.

According to an aspect of the present invention, an information processing apparatus including an acquisition unit configured to acquire virtual viewpoint information of a plurality of frames contained in a virtual viewpoint video, a selection unit configured to select a camera for shooting an image to be used in generating an image at a virtual viewpoint in a frame from a plurality of cameras with respect to each of the plurality of the frames based on a positional relationship between the virtual viewpoint information of each frame and viewpoint information of the plurality of the cameras, and a reselection unit configured to reselect the camera selected for each of the plurality of the frames, wherein, if a camera selected for a target frame differs from a camera selected for a preceding frame of the target frame, and if a rate of covering an image at the virtual viewpoint of the target frame with a shot image of the camera selected for the preceding frame is greater than a predetermined value, the reselection unit changes the camera selected for the target frame to the camera selected for the preceding frame.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating processing performed in the capture PC.

FIGS. 6A to 6C are examples of scenario data and screening control information.

FIG. 7 is a flowchart illustrating transmission processing performed in the capture PC.

DESCRIPTION OF THE EMBODIMENTS

Various exemplary embodiments, features, and aspects of the invention will be described in detail below with reference to the drawings.

Figure 1A:
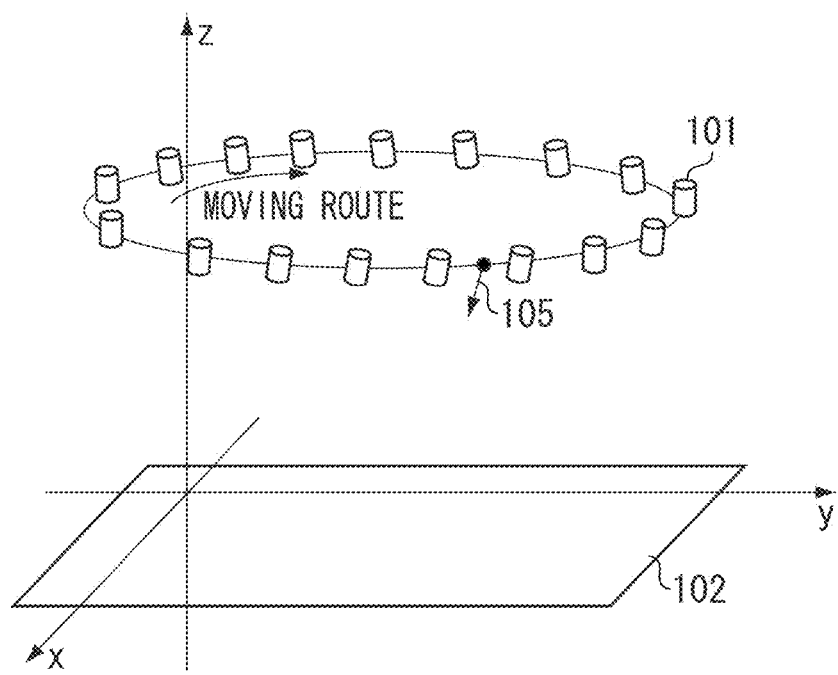
FIGS. 1A and 1B are conceptual diagrams illustrating an image reproduction apparatus according to a first exemplary embodiment of the present invention.
Figure 1B:
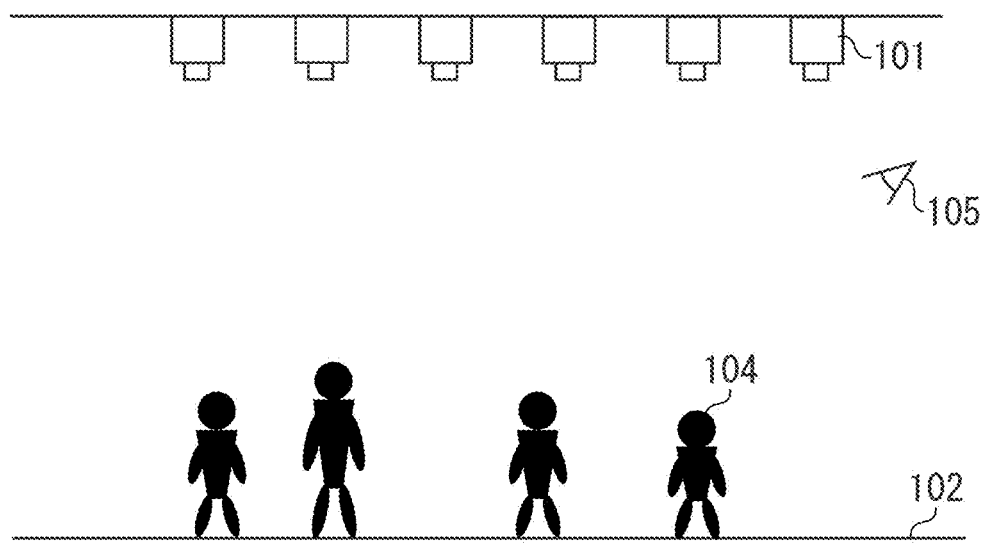

In a first exemplary embodiment, an image reproduction apparatus for generating a video viewed from a virtual viewpoint that moves according to a predetermined scenario (for example, see FIG. 6A) using videos shot by a plurality of fixed cameras (imaging units), and screening the video in real time is described. FIGS. 1A and 1B illustrate a concept according to the present exemplary embodiment. As illustrated in FIG. 1A, the fixed cameras according to the present exemplary embodiment are installed along a moving route of the virtual viewpoint such that shooting regions of the cameras overlap with each other. In FIG. 1A, shooting cameras 101 are fixed by a metal frame (not shown) in a hanging manner with respect to a floor surface 102.

As shown in FIG. 1A, the virtual viewpoint is set on a coordinate system including the floor surface 102 on an x-y plane, and a z axis as its height direction.

In the scenario data according to the present exemplary embodiment, a virtual viewpoint coordinate for expressing a position, a direction, and an orientation of the virtual viewpoint, a virtual viewpoint direction, and vectors of a virtual viewpoint upper direction are described with respect to each frame in screen time. The virtual viewpoint coordinate and the virtual viewpoint direction show a position and a direction of the virtual viewpoint in the coordinate system. The virtual viewpoint upper direction vector is a parameter for defining how much the field of view is tilted to the direction of the virtual viewpoint. The virtual viewpoint direction is orthogonal to the virtual viewpoint upper direction vector. By adding an angle of view to the scenario data, the field of view from the virtual viewpoint can be expressed.

In the present exemplary embodiment, by further adding lens effect parameters (intensity of distortion $\alpha$, and intensity of decrease in marginal illumination $\beta$) to the scenario data, a natural video from the virtual viewpoint as if shot by a camera actually moving can be generated from the videos of the fixed cameras. Further, a height of a reference plane which is a parameter used in virtual viewpoint video generation processing is stored. Information about the height of the reference plane has an effect on smoothness in switching cameras to be used. For example, in the present exemplary embodiment, in a case where substantially no person is present in a shooting region, it is preferable to define the floor as the reference plane. However, in a case there are many people in the shooting region, it is preferable to define an approximate average height of persons as the reference plane to generate a smooth video.

By storing the information about the height of the reference plane in the scenario data, the height of the reference plane can be changed depending on a state of an object. The change of the height of the reference plane can be automatically generated from shot images by each camera or manually specified.

FIG. 1B is a view obtained by projecting FIG. 1A on a two-dimensional surface. In FIG. 1B, it is assumed that more than one person is in the scene. In FIG. 1B, a person 104 is to be an object. A virtual viewpoint 105 is set in the scene.

Figure 2:
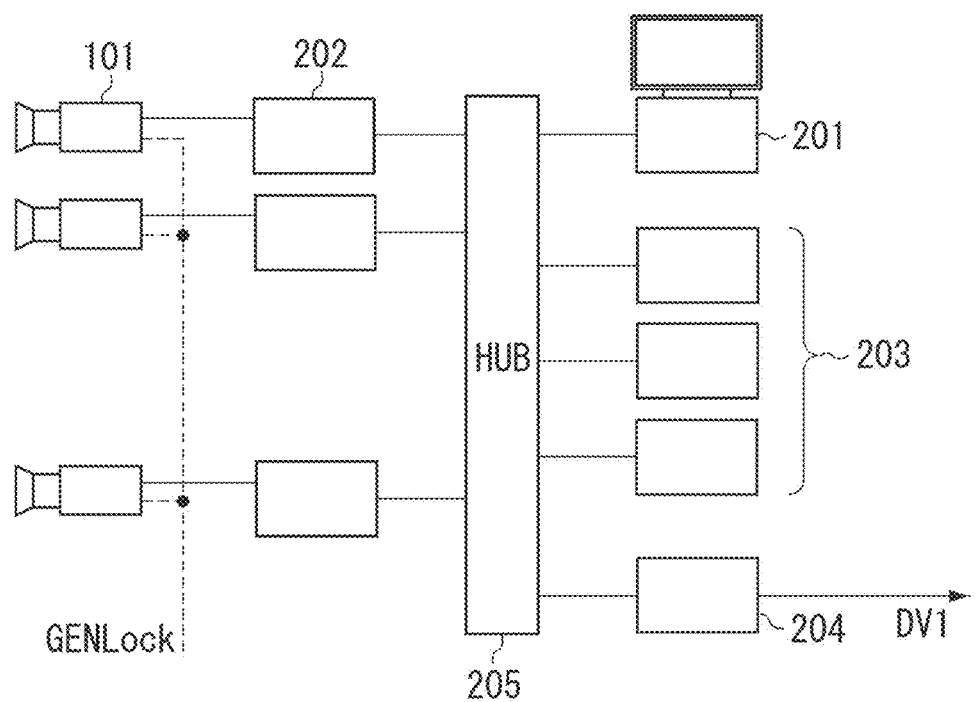
FIG. 2 illustrates a system configuration according to the first exemplary embodiment.

FIG. 2 illustrates a system realizing the present exemplary embodiment. In the system, a management server PC 201 manages the entire system. Since the management server PC 201 controls the entire system, operation devices such as a console screen, a keyboard, and a mouse are connected only to the management server PC 201. Each shooting camera 101 is connected to a capture PC 202 with a High Definition Serial Digital Interface (HD-SDI) cable, and a video is transmitted to an image processing PC via the capture PC 202.

For example, in the present exemplary embodiment, an output resolution of the camera is a full HD resolution (1920*1080 pixels, 30 frames per second). Then, the data amount is very large. Accordingly, if videos of the all cameras are transmitted at the same time, the band width of the communication path is fully used. To solve the problem, screening control information (see FIGS. 6B and 6C) for reproducing the predetermined scenario using currently available cameras and PCs is generated, and transmission of the video data is controlled according to the screening control information. In the screening control information, a correspondence relationship between the videos of the cameras and the PCs to process the data is described with respect to each frame from screening start time to end time.

In camera control information (FIG. 6B), "0" means that transmission of video data is not necessary, "1" means to transmit video data, and "2" means to transmit only header information. In PC control information (FIG. 6C), "1" means to use a corresponding PC, and "0" means not to use a corresponding PC. As illustrated in FIGS. 6A to 6C, the time contained in the screening control information indicates relative time to the screening start time of 0:00:00.00f.

An image processing PC 203 receives and processes image data transmitted from the capture PC 202 and transmits the processed image data to an image display PC 204. The image display PC 204 receives the video transmitted from the image processing PC 203, performs buffering on the video, and outputs the video that is buffering-processed at timing specified by the management server PC 201 to display. Each PC is connected with each other with a network hub 205 through a local area network (LAN), and data is transmitted or received using a Transmission Control Protocol/Internet Protocol (TCP/IP). Functions of each PC are described below in detail. All of the shooting cameras 101 are to be synchronized. Accordingly, a synchronizing signal (generator lock, genlock) is supplied thereto.

Hereinafter, functions described with reference to flowcharts are realized by reading a program code recoded in a recording medium such as a read-only memory (ROM) in each PC by a computer (processor). It is not necessary to implement all of the functions by the computer according to the program. A specific function can be realized by using a circuit.

<Capture PC>

Figure 3:
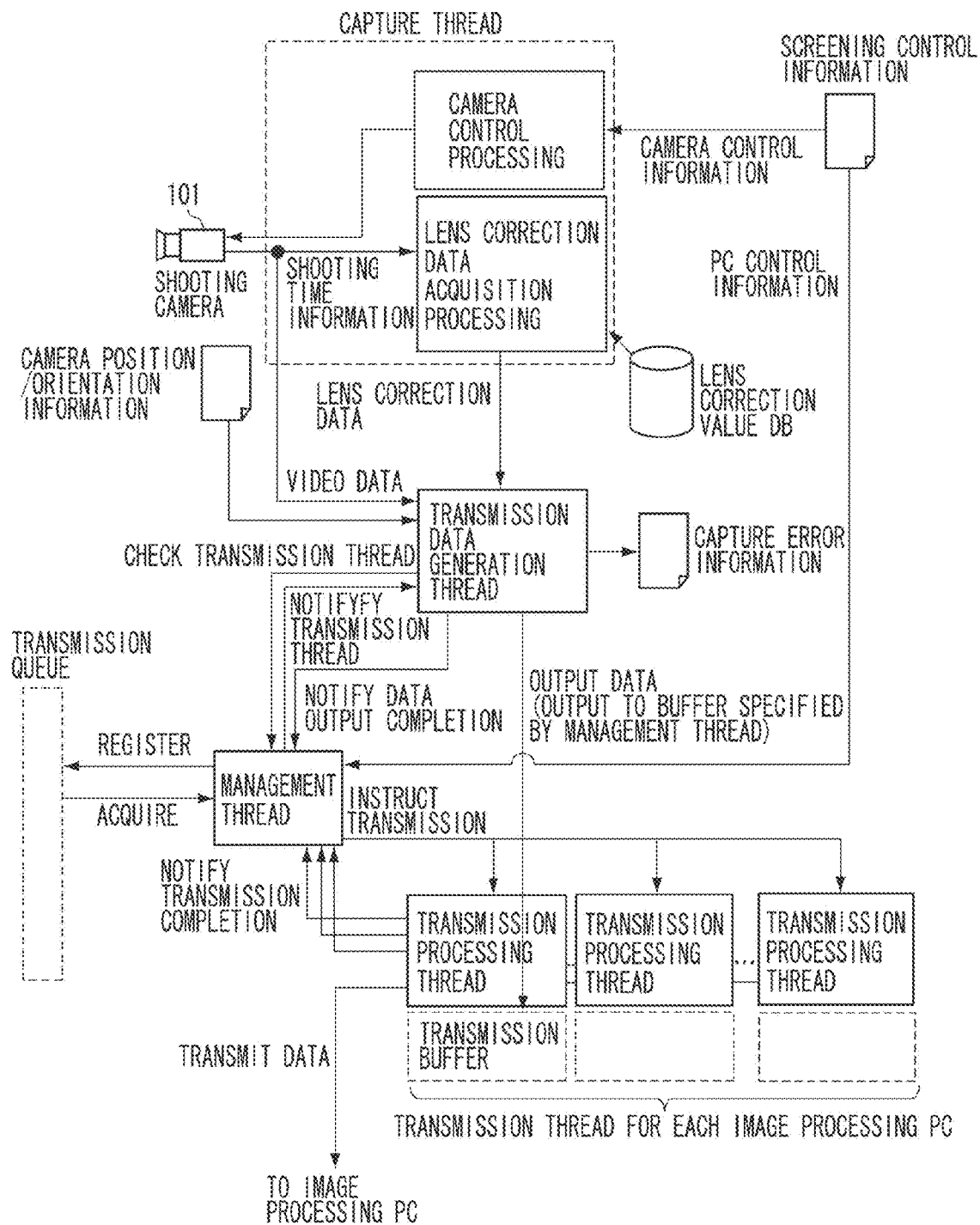
FIG. 3 is a schematic view Illustrating processing performed in a capture personal computer (PC).

The capture PC 202 captures a video from a camera and transmits the video to the image processing PC 203. FIG. 3 is a schematic view illustrating processing performed in the capture PC 202. Sometimes, received data is not transmitted without delay due to a problem in a band width of a transmission path. To solve the problem, a function to perform buffering processing for predetermined several seconds is provided. In the virtual viewpoint video generation processing performed in the image processing PC 203, lens characteristic data in shooting is necessary. However, it is known that the lens characteristic data varies depending on setting for shooting (for example, F-number, angle of view, and shooting distance) of a camera. Accordingly, the capture PC 202 acquires lens correction data corresponding to the setting for shooting from a lens correction value database.

Figure 4:
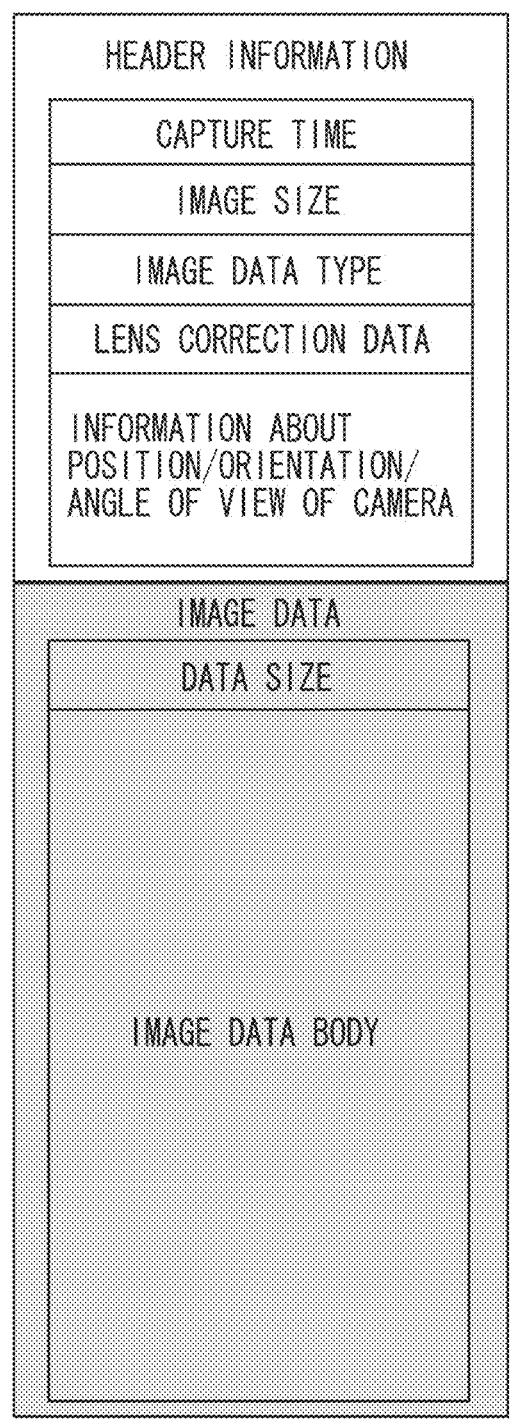
FIG. 4 illustrates a data format of image data to be transmitted from the capture PC to an image processing PC.

The acquired lens correction data is added to the image data and transmitted (see FIG. 4). The lens correction data can include various pieces of correction data such as distortion, marginal illumination, and chromatic aberration of magnification. In the present exemplary embodiment, for the sake of simplifying the description, correction data of distortion and marginal illumination is stored in the image data. Further, to generate a virtual viewpoint video, information such as a position, a direction, an orientation, and an angle of view of the shooting camera 101 are necessary. Accordingly, the above described information pieces are also added to the image data.

Data transmission and reception processing is performed by a TCP/IP. Since it is inefficient to reconnect to the image processing PC 203 each time the data is transmitted, a thread for performing the transmission processing is provided for each of the image processing PCs. FIG. 5 is a flowchart of the transmission processing. In addition to the transmission processing thread, a transmission data generation thread and a management thread are provided. The transmission data generation thread receives a video from a camera, adds a header and lens correction data thereto, and generates transmission data. The management thread manages the transmission processing thread. In step S501, first, the transmission data generation thread inquires which transmission processing thread to be used of the management thread. In step S502, according to the screening control information received from the management server PC (described below), the management thread selects the image processing PC 203 as a destination, and notifies the transmission data generation thread of the transmission processing thread connected to the selected image processing PC 203.

In step S503, the transmission data generation thread acquires a transmission data region in a transmission buffer in the thread specified by the management thread. In step S504, the transmission data generation thread outputs the transmission data generated from the captured video to the acquired transmission data region. In step S505, the transmission data generation thread notifies the management thread of the completion of the data output. In step S506, the management thread adds the data corresponding to the received data output completion notification to a transmission queue, and performs the transmission processing illustrated in FIG. 7.

FIG. 7 is a flowchart illustrating the flow of the transmission processing. In step S701, the management thread checks the first data in a transmission queue provided in itself. If the transmission queue is empty, the management thread is in a standby state until the notification from the transmission data generation thread in step S505 is transmitted.

If the transmission queue is not empty, in step S702, the management thread determines whether the data is valid. In the determination, if a difference between capture time T0 stored in the header information of the target data and screening start time T1 corresponding to the target data in the screening control information does not exceed predetermined time TL (YES in step S702), the management thread determines that the data is valid. If the difference exceeds the time TL (NO in step S702), the management thread determines that the data is invalid. If it is determined that the data is invalid, the transmission processing is skipped and the processing returns to step S701.

If it is determined that the data is valid, then in step S703, the management thread issues a transmission instruction to a transmission processing thread to perform the transmission processing. The transmission processing thread to which the transmission instruction is issued is selected based on PC control information contained in the screening control information. In step S704, the transmission processing thread that received the transmission instruction notifies the management thread of transmission start, and starts the transmission.

In step S705, when the transmission is completed, the transmission processing thread notifies the management thread of the transmission completion, and returns to the standby state. In step S706, if an instruction to end the capture processing is not issued (NO in step S706), the management thread that received the notification of the transmission completion returns the processing to step S701. If the instruction to end the capture processing is issued (YES in step S706), the management thread ends the transmission processing.

Whether to compress the image data to be transmitted or not can be specified by a setting file. In an image data type in FIG. 4, when the data is to be compressed, "1" is specified and when the data is not to be compressed, "0" is specified. When only the header is to be transmitted, "2" is specified. The compression of the video data is required to be done in frame units. Generally, for the compression format, a Joint Photographic Experts Group (JPEG) format is used. However, in the present exemplary embodiment, DirectX Texture Compression (DXTC) is used. By using graphics processing units (GPU), the DXTC can compress the image data at a high speed. Accordingly, in the case of the present exemplary embodiment where real-time processing is important, the DXTC is useful.

When capturing a video from the camera, the transmission data generation thread counts a rate a capture error occurred, and prepares to return the state to respond to a valid determination from the management server PC which is described below. The capture error is likely to occur when a distance between a camera and a capture PC is long (for example, more than 100 m) and acquisition of a video at 30 frames per second is difficult, or the like. For example, in the present exemplary embodiment, when the number of frames that were not able to be acquired due to a capture error exceeds 10% of the number of capture target frames, it is determined that "there are many capture errors".

<Image Processing PC>

Figure 8:
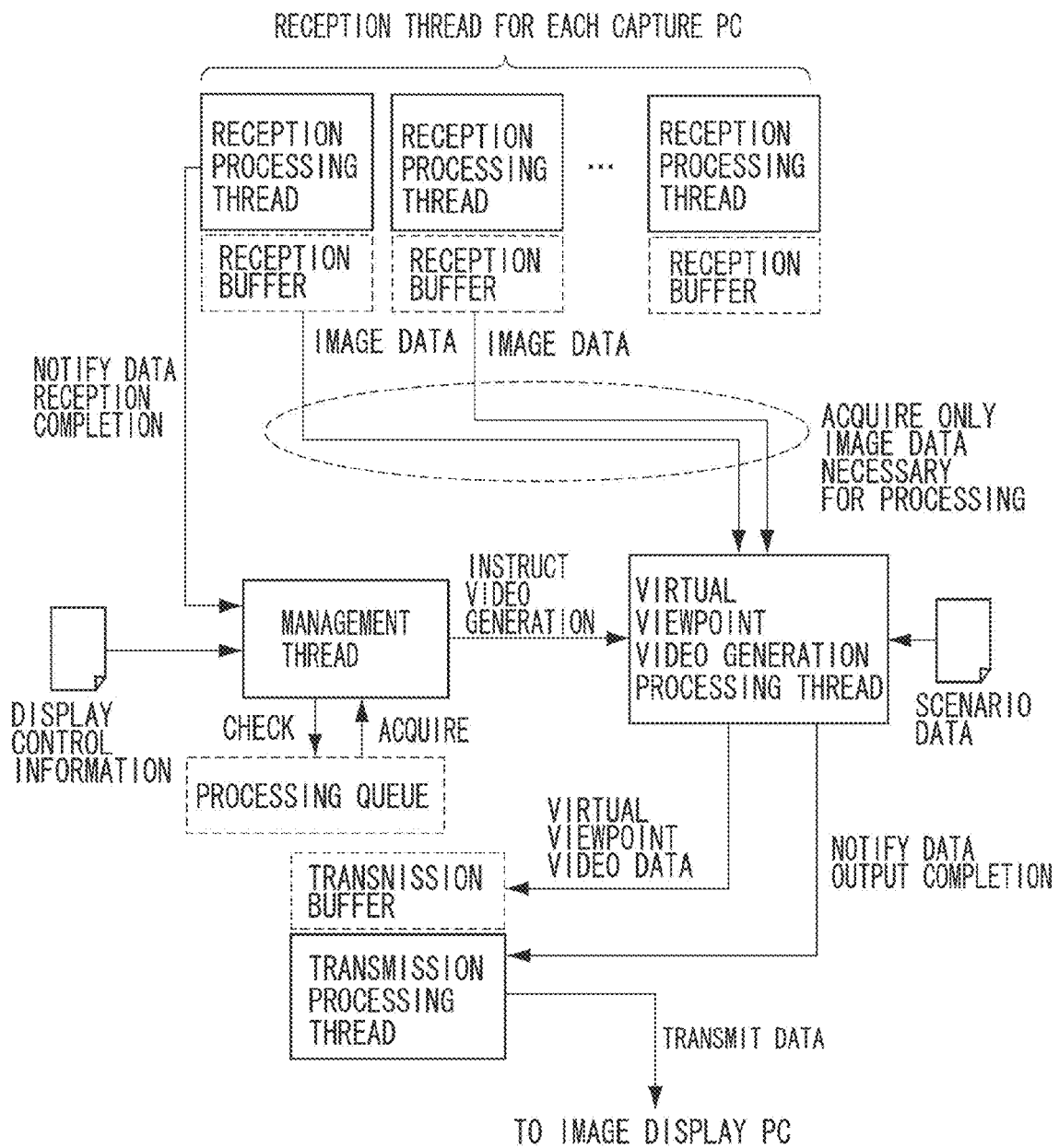
FIG. 8 is a schematic view illustrating processing performed in the image processing PC.

The image processing PC 203 processes a video received from the capture PC 202 and transmits the processed video to the image display PC 204. FIG. 8 is a schematic view illustrating the processing performed in the image processing PC. Similarly to the capture PCs, to maintain a state connected to all of the capture PCs, data reception threads for each of the capture PCs is activated.

Figure 9:
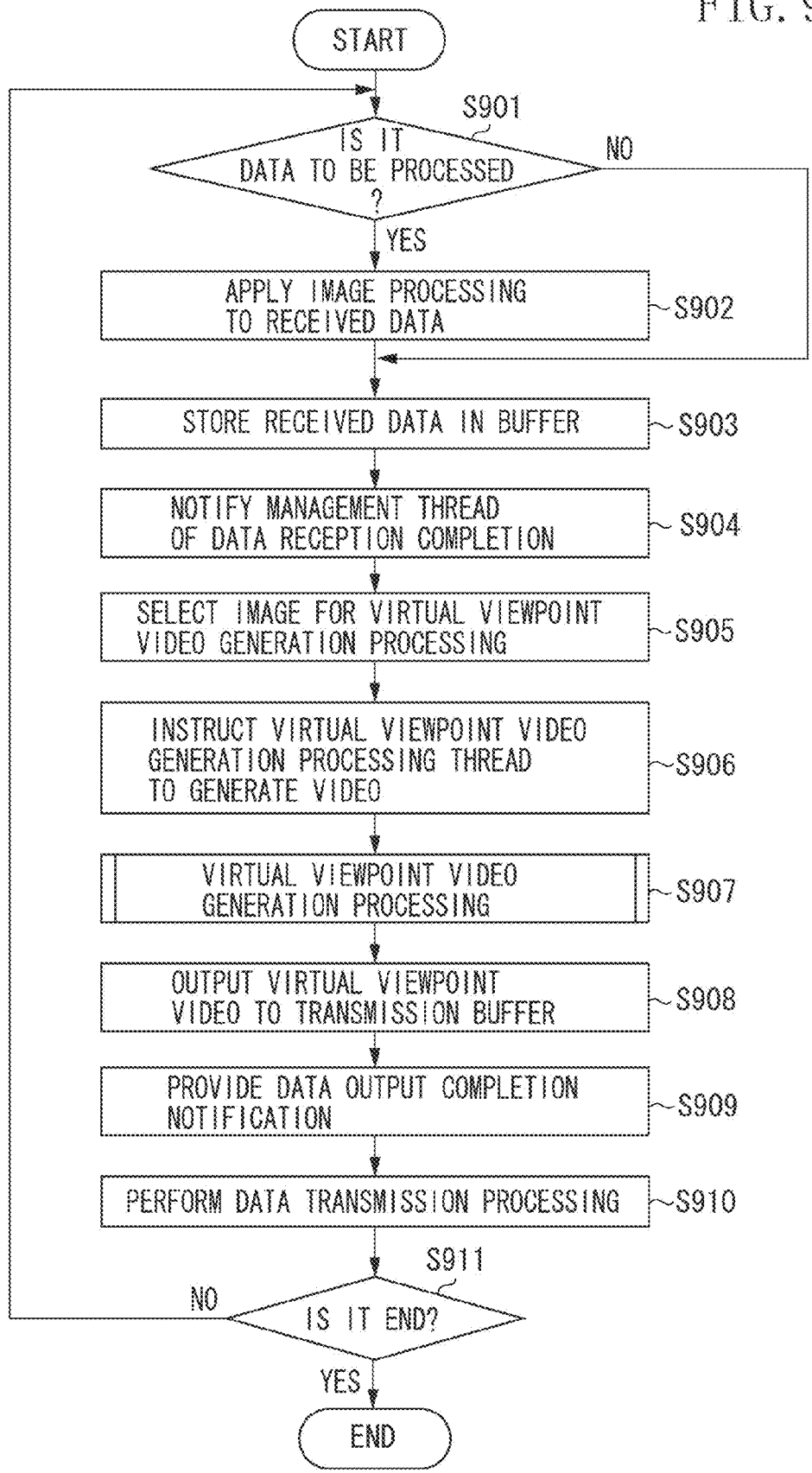
FIG. 9 is a flowchart illustrating processing performed in the image processing PC.

FIG. 9 is a flowchart illustrating the flow of the processing performed in the image processing PC 203. In steps S901 and 902, a reception processing thread applies processing corresponding to the image data type to the received data. In step S903, the reception processing thread stores the data in a reception buffer.

If the image data type is "1", the reception processing thread applies processing for decompressing the compressed data, and converts into uncompressed data (image data type=0). In step S904, after storing the received data in the reception buffer, the reception processing thread notifies the management thread of the completion of the data reception.

In step S905, the management thread selects an image according to the screening control information. In step S906, the management thread issues a video generation instruction to a virtual viewpoint video generation processing thread. After the video generation instruction is issued, if the management thread has not received a data output completion notification from the virtual viewpoint video generation thread, the management thread blocks the video generation instruction until the data output completion notification is received. The processing is performed because if a plurality of virtual viewpoint video generation processing is performed at the same time, throughput of video generation processing being processed is decreased, and a possibility that the real-time reproduction become impossible is increased.

In step S907, the virtual viewpoint video generation thread that received the video generation instruction generates an image according to the scenario using the video and the screen time selected by the management thread. The virtual viewpoint video generation processing is described in detail below.

In step S908, the virtual viewpoint video generation thread outputs the generated video to the transmission buffer. In step S909, the virtual viewpoint video generation thread notifies the management thread and the transmission processing thread of the completion of the data output.

Figure 10:
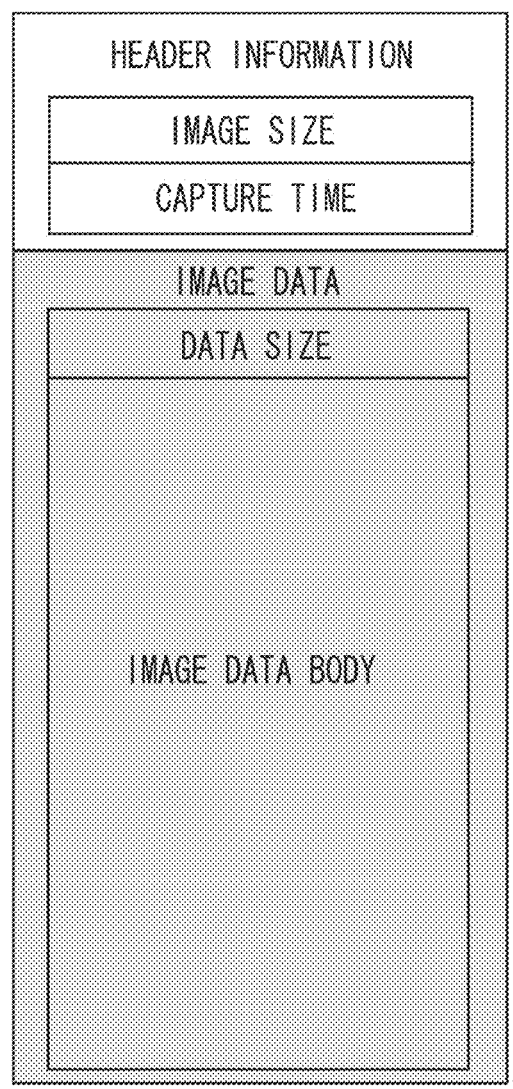
FIG. 10 illustrates a format of data to be transmitted from the image processing PC to an image display PC.

In step S910, the transmission processing thread receives the notification of the data output completion, and transmits the generated virtual viewpoint video data to the image display PC 204. To the video data to be transmitted, as illustrated in FIG. 10, the capture time and the image resolution are added as the header.

In step S911, if an instruction to end the capture processing is not issued (NO in step S911), the transmission processing thread returns the processing to step S901. If the instruction to end the capture processing is issued (YES in step S911), the transmission processing ends.

<Image Display PC>

The image display PC 204 includes the following functions:
(a) reproduction of data received from the image processing PC (normal screening); and
(b) screening of backup video (backup screening).

Figure 11:
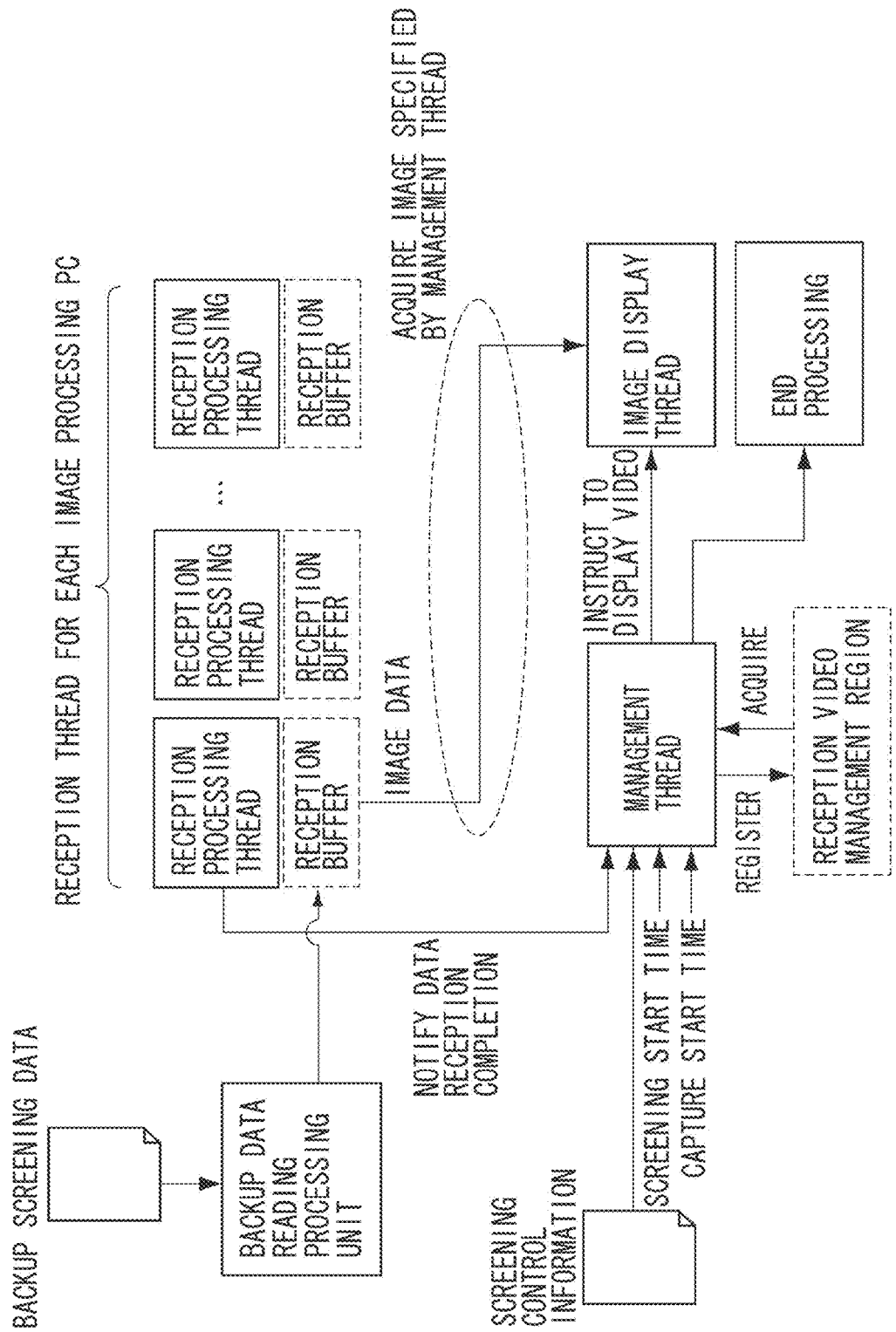
FIG. 11 is a schematic view illustrating processing performed in the image display PC.

FIG. 11 is a schematic view illustrating the processing performed in the image processing PC 204. The image display PC 204, similarly to the image processing PC 203, has a reception thread corresponding to each image processing PC 203, and performs buffering of received data. The image display PC has a large-capacity memory to perform buffering of all videos to be targets of screening. The memory is necessary for generating a backup video.

Figure 12:
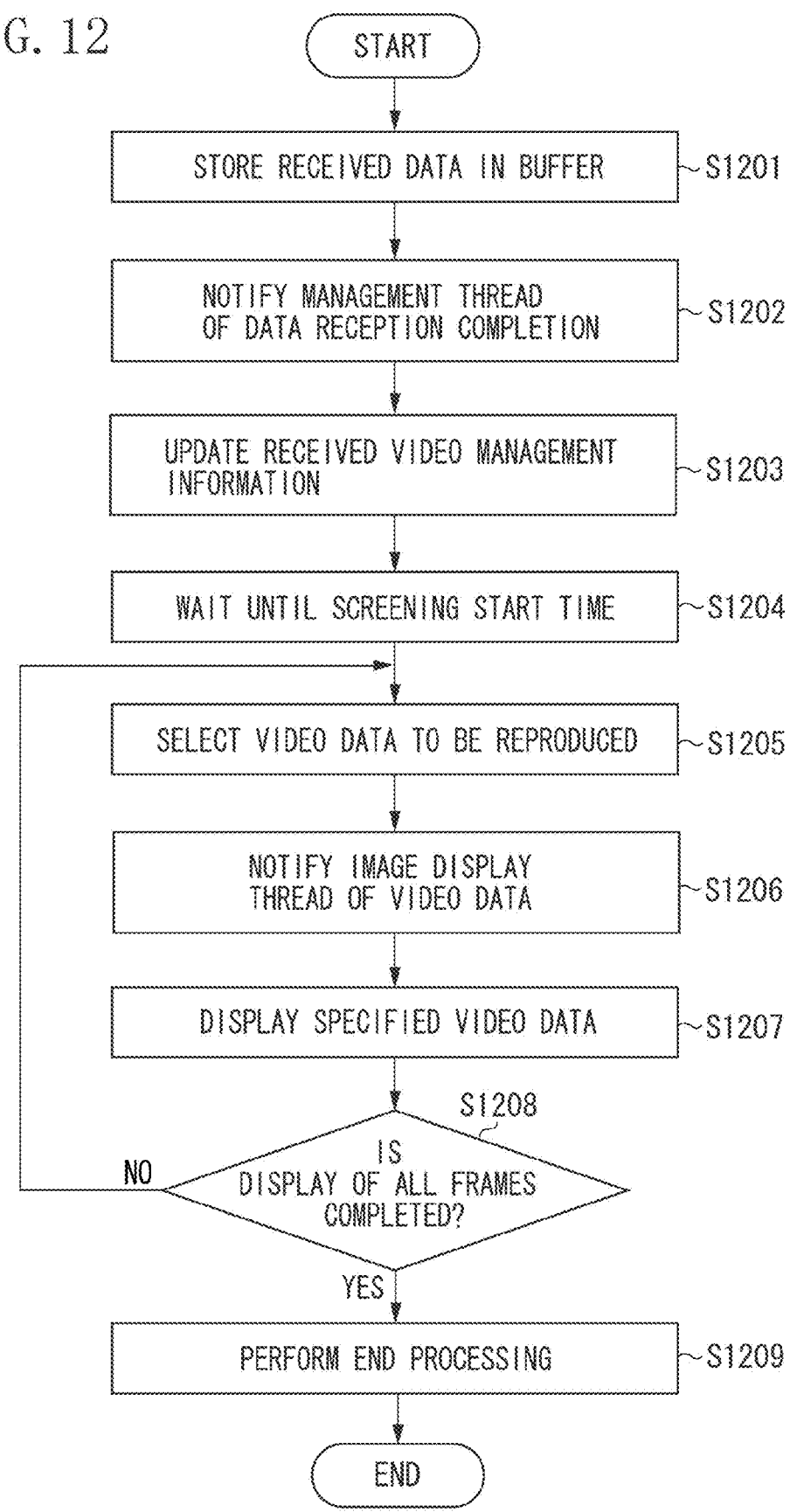
FIG. 12 is a flowchart illustrating normal screening processing.

FIG. 12 is a flowchart illustrating the flow of the normal screening processing. In step S1201, the reception processing thread receives a video from the image processing PC 203, and stores the video in the reception buffer. In step S1202, each time reception of one frame of video is completed, the reception processing thread transmits a data reception completion notification to the management thread. In step S1203, the management thread updates reception video management information in a reception video management region in response to reception of the data reception completion notification. The reception video management information includes capture time of the received video data and a classification identification (ID) of the reception processing thread.

In step S1204, the management thread waits until screening start time. The management thread performs screening management processing from the screening start time to screening end time. In step S1205, in the screening management processing, the management thread selects video (frame) data to be a reproduction target from the reception buffer. In step S1206, the management thread notifies an image display thread of the selected data. The selection of the video data is performed using the capture time of each video data or the classification ID of the reception processing thread in the reception video management region.

The screening control information is described by relative time based on the screening start time. Accordingly, capture time to be the reproduction target is calculated using capture start time, and an image corresponding to the capture time is obtained.

In step S1207, the image display thread displays the specified video data. Then, step S1208 is repeated until the reproduction processing is applied to all frames. After all of the frame images are displayed (YES in step S1208), in step S1209, the management thread performs end processing. If there is no corresponding video data due to, for example, delay of the processing, the display is not updated, and the display of the video immediately previously displayed is continued. Above described processing can prevent the screen time from being extremely shortened due to lack of frames or the screened video from being unnatural.

In the end processing according to the present exemplary embodiment in step S1209, all pieces of frame data are stored in a file. The file is used as a backup video. If the video is screened a plurality of times, all screened videos can be stored, or only the video that has no lack of frames can be stored.

In the processing, due to failure of a plurality of cameras or PCs, the screening may not be performed normally. In such a case, the screening is switched to backup screening by determination processing in the management server PC, which is described below. In the present exemplary embodiment, the latest video in the file stored as a result of the normal screening is used as the video used for the backup screening. Alternatively, a predetermined file can be screened.

Figure 13:
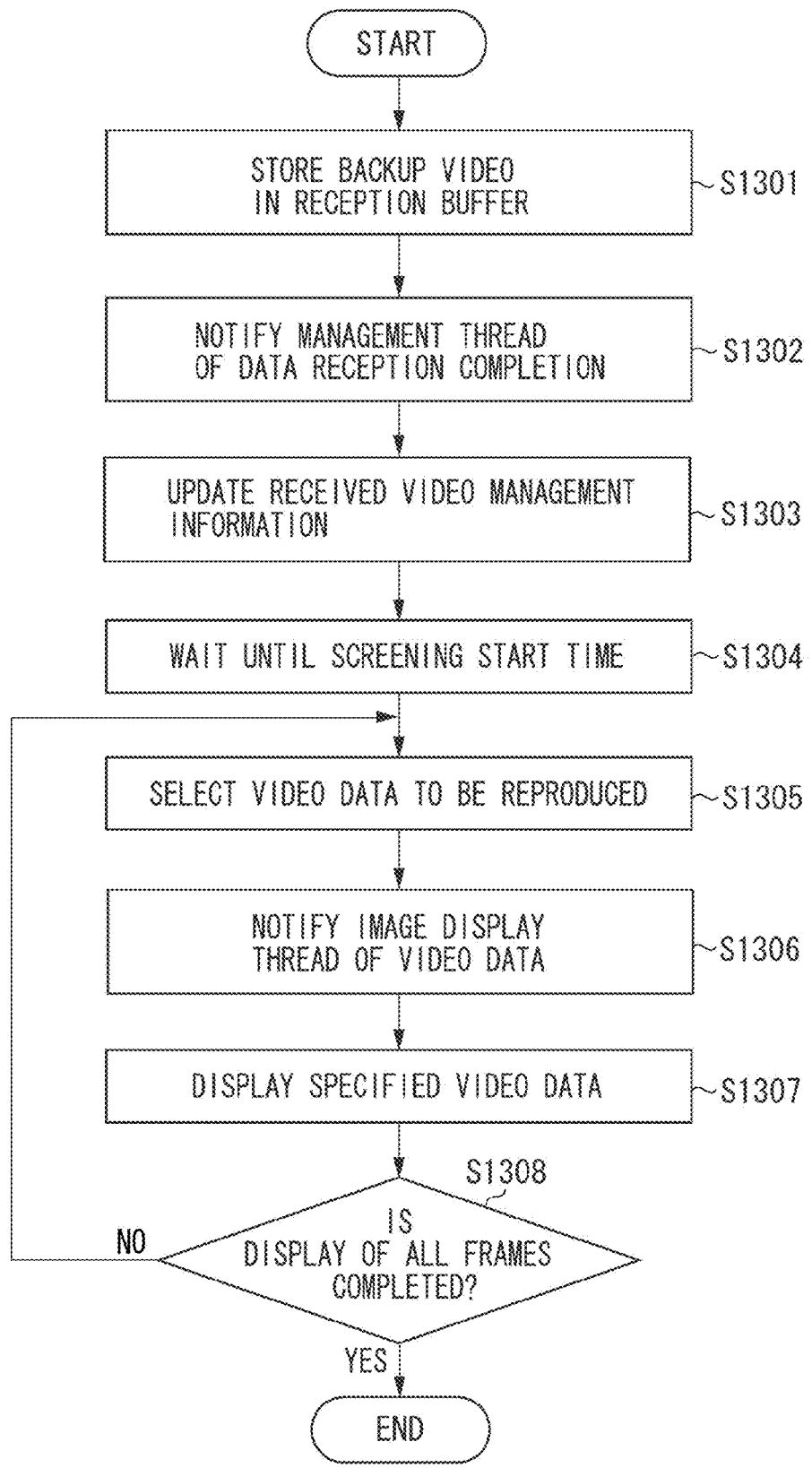
FIG. 13 is a flowchart illustrating backup screening processing.

FIG. 13 is a flowchart illustrating the flow of the backup screening. In the backup screening, in step S1301, instead of performing the reception processing, backups video data is read in the memory. In the following processing (from step S1302 to step S1308), similar processing to that in the normal screening (from step S1202 to step S1208) is performed. In the backup screening, output of the file of the screening data is not performed.

<Management Server PC>

The management server PC 201 manages the entire system. More specifically, the management server PC 201 includes the following functions:
(a) valid determination of a PC or a camera in the system;
(b) changing video buffering time in each PC;
(c) generation of the screening control information based on the above functions (a) and (b);
(d) distribution of the scenario data and the screening control information; and
(e) distribution of setting files of the capture PC and the image processing PC.

Figure 14:
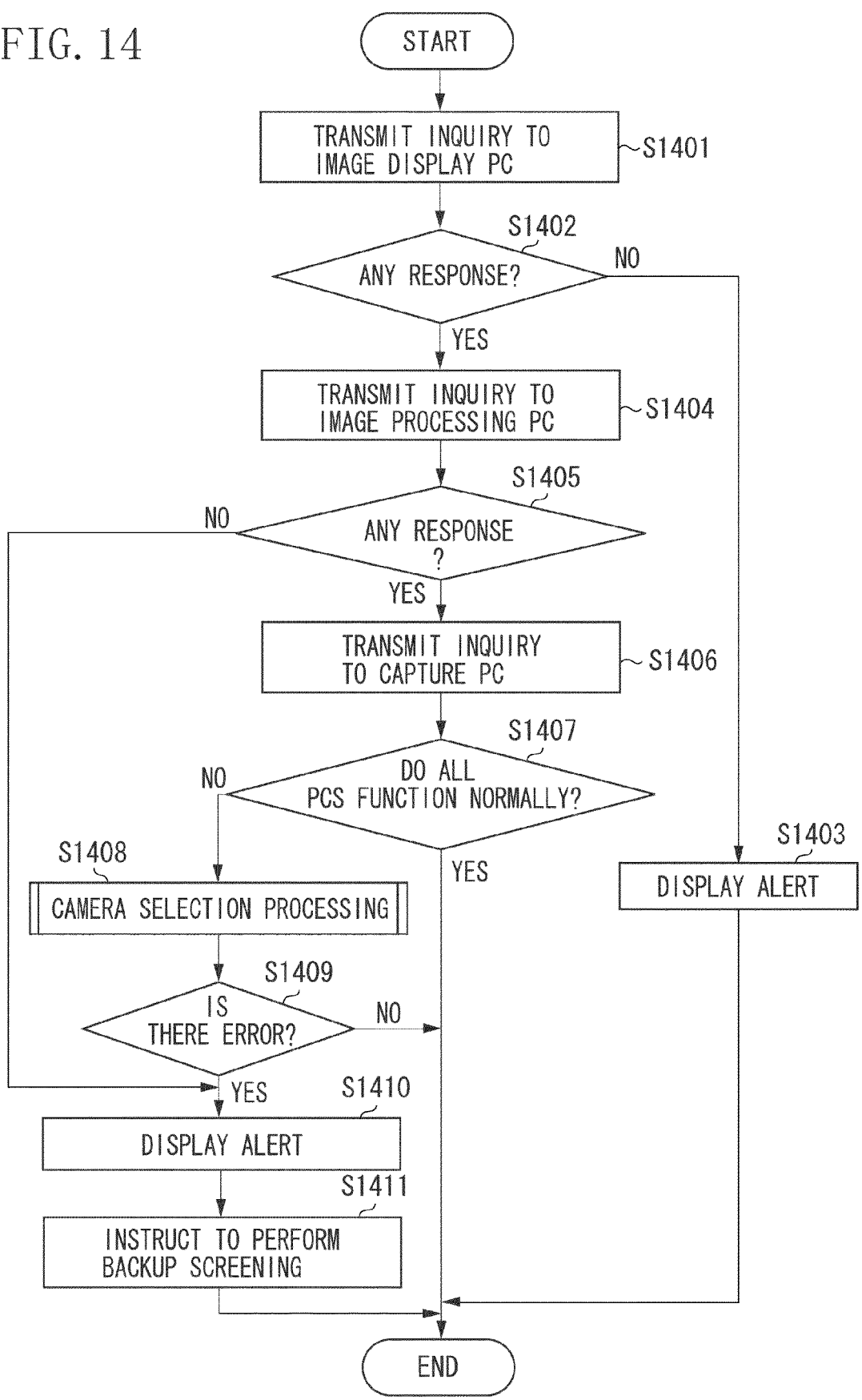
FIG. 14 is a flowchart illustrating validity determination processing of a camera or a PC.

The valid determination of the PC or the camera is described below. FIG. 14 is a flowchart illustrating the flow of the valid determination processing. In step S1401, the management server PC 201 transmits an inquiry to the image display PC. In step S1402, the management server PC 201 checks whether a response is returned within predetermined time TA. In step S1402, the image display PC and the image processing PC return "0" to the inquiry. The capture PC returns "1" if the capture PC cannot identify the camera. If the capture PC can identify the camera but many capture errors occur, the capture PC returns "2". In other cases, the capture PC returns "0".

Figure 15A:
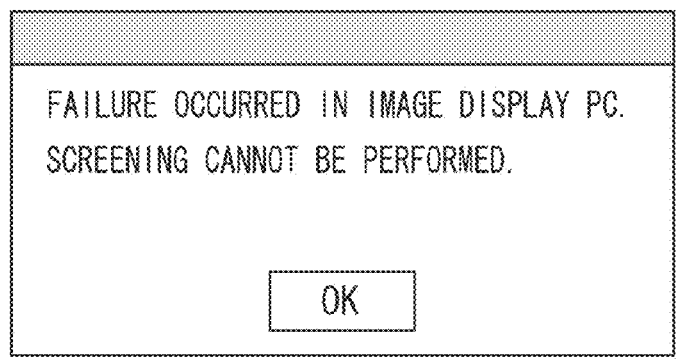
FIGS. 15A to 15C are examples of an alert display dialogue.

If there is no response from the image processing PC (NO in step S1402), it is not possible to perform the screening. Accordingly, in step S1403, the management server PC 201 performs an alert display illustrated in FIG. 15A, alerts the user to replace the equipment, and ends the processing. If the response is returned from the image display PC (YES in step S1402), there is no problem in the image display PC. Then, in step S1404, the management server PC 201 transmits an inquiry to each image processing PC. In step S1405, the management server PC 201 checks whether a response is returned within the predetermined time TA.

Figure 15B:
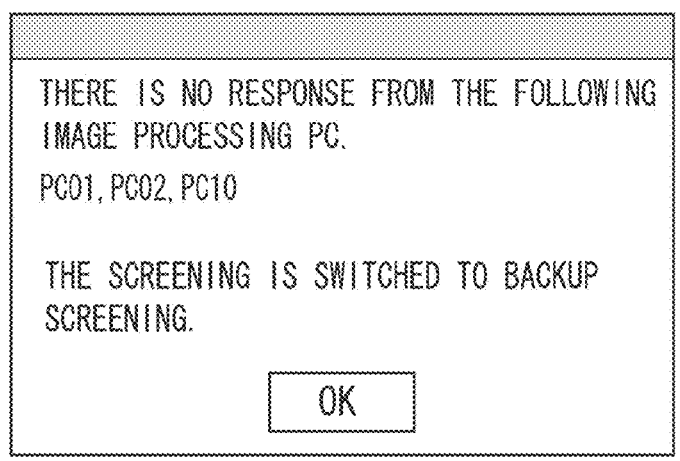

If one image processing PC does not respond (NO in step S1405), in step S1410, the management server PC 201 performs an alert display illustrated in FIG. 15B. Then, in step S1411, the management server PC 201 instructs the image processing PC to screen a backup video, and ends the processing. If there is no problem in the image processing PC (YES in step S1405), then in step S1406, the management server PC 201 transmits an inquiry to the capture PC.

In step S1407, if the capture PC cannot respond or the returned value includes a value other than "0" ("1" or "2") (NO in step S1407), in step S1408, the management server PC 201 performs camera selection processing, which is described below. The camera selection processing is for generating screening control information for performing screening according to a scenario using cameras except for an unavailable camera. The camera selection processing is described in detail below.

If processing time of the virtual viewpoint video generation processing performed in the image processing PC is longer than an interval for reproducing frames in the image display PC (for example, in a case of display of 30 frames per second, $\frac{1}{30}$ second), it is not possible to perform real-time reproduction. To solve the problem, in the present exemplary embodiment, a plurality of the image processing PCs are provided to perform interleave processing. For example, if ten image processing PCs are provided, the virtual viewpoint video generation processing can be performed within less than $\frac{1}{3}$ second.

Figure 15C:
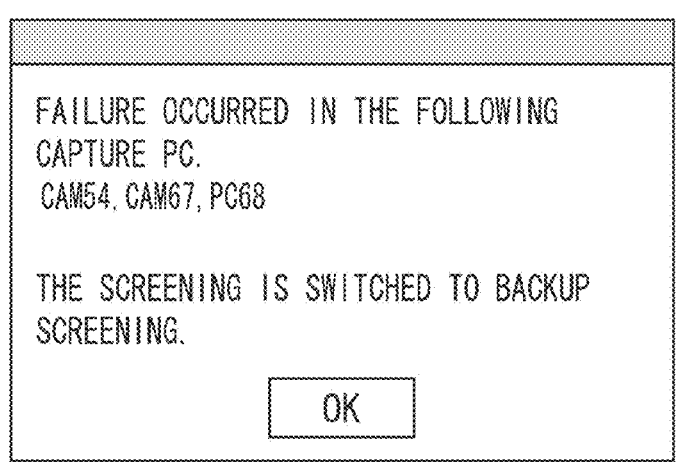

If an error occurs in the camera selection processing (YES in step S1409), then in step S1410, the management server PC 201 performs an alert display illustrated in FIG. 15C. Then, in step S1411, the management server PC 201 instructs the image display PC to perform screening of the backup video, and ends the processing.

In the present exemplary embodiment, the setting file of the application performed in the all PCs in the screening system is located in a public shared folder of each PC. Accordingly, by accessing the shared folder of each PC from the management server, the setting can be changed. For example, the video buffering time in each PC and the backup screening instruction in the image display PC are performed through the above-described method.

<Virtual Viewpoint Video Generation Processing>

In the virtual viewpoint video generation processing according to the present exemplary embodiment, taking a plane of a certain height as a reference plane, a video is generated such that an object on the reference plane is smoothly connected when cameras are switched. In the virtual viewpoint video generation processing, the following video correction, conversion, and video effect addition is consistently performed:
(1) correction of distortion and chromatic aberration of magnification of a camera video;
(2) correction of decrease in marginal illumination;
(3) perspective conversion generated between a virtual viewpoint video and a camera video;
(4) addition of an effect of decrease in marginal illumination to a virtual viewpoint video; and
(5) addition of a distortion effect.

In the present exemplary embodiment, an image at a virtual viewpoint corresponding to distortion characteristics and characteristics in decrease in marginal illumination of a virtual camera is generated from an image shot by the camera having distortion characteristics and characteristics in decrease in marginal illumination. In the virtual viewpoint video generation processing according to the present exemplary embodiment, the above described operation is consistently performed. Accordingly, the processing can be efficiently performed, and suitable for the image processing apparatus according to the present exemplary embodiment that requires real-time processing.

Figure 17:
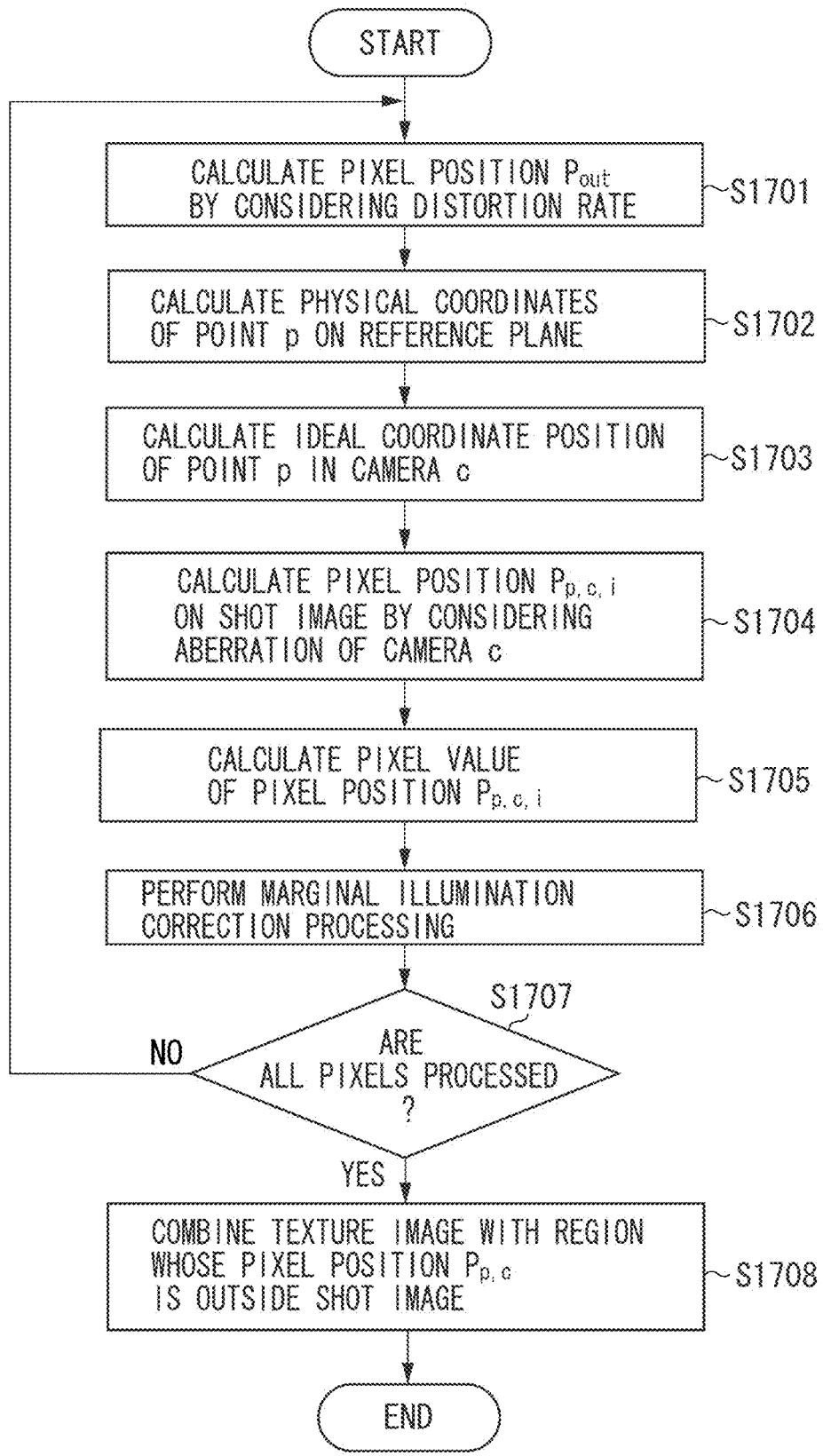
FIG. 17 is a flowchart illustrating the virtual viewpoint video generation processing.

FIG. 17 is a flowchart illustrating the flow of the virtual viewpoint video generation processing. The virtual viewpoint video generation processing is described in detail below.

Figure 16A:
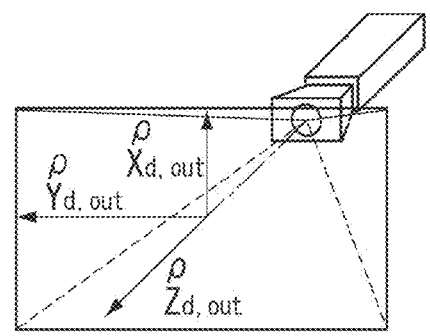
FIGS. 16A and 16B illustrates parameters to be used in virtual viewpoint video generation processing.
Figure 16B:
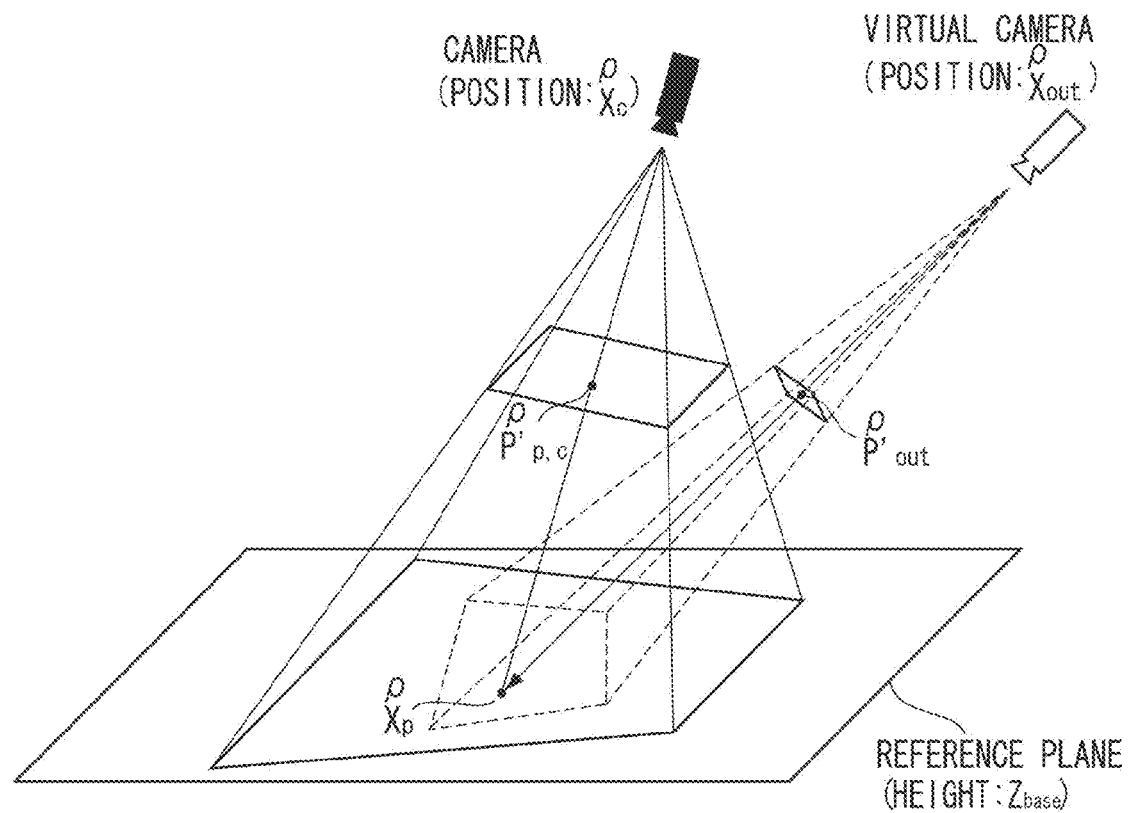

First, a physical position of the virtual camera is denoted by,
$\overline{X}_{out}$
a direction of the virtual camera is denoted by,
$\overline{Z}_{d,out}$
a vector indicating an upper direction on the screen of the virtual camera is denoted by,
$\overline{Y}_{d,out}$
and, a vector indicating a right direction on the screen of the virtual camera is denoted by,
$\overline{X}_{d,out}$
(see FIGS. 16A and 16B).
$\overline{X}_{d,out}$
$\overline{Y}_{d,out}$
$\overline{Z}_{d,out}$
are the vectors that indicate only directions. Accordingly, the length thereof is set to one. For the coordinate system for expressing these vectors, the above-described coordinate system in which the floor surface is taken as the x-y plane and its height direction is the z axis is used. It is assumed that a horizontal half angle of view and a vertical half angle of view of the virtual camera are denoted by θh,out, and θv,out, respectively. In the virtual viewpoint video generation processing, the processing is performed for each pixel in the virtual viewpoint video.

Here, a coordinate of a target pixel whose pixel value is to be determined is denoted by,
$\overline{P}_{out}$
First, in order to reflect the distortion characteristics (distortion effect) set to the virtual camera onto the virtual viewpoint video, in step S1701, an inverse transformation (distortion correction) of the distortion effect is performed to the coordinate of the target pixel. Then, a pixel coordinate
$\overline{P}'_{out}$
of the virtual viewpoint video after the distortion correction is calculated. The specific mathematical expression of the inverse transformation, which depends on which distortion effect is to be expected, can be obtained by using, for example, the following expression (1):

$$\overline{P}'_{out} = (1 + \alpha |\overline{P}_{out,center}|^2)(\overline{P}_{out} - \overline{P}_{out,center}) + \overline{P}_{out,center} \quad (1)$$

In the expression (1),
$\overline{P}_{out,center}$
is a central pixel position of an arbitrary viewpoint video. α is a parameter for controlling the strength of the distortion effect.

In step S1702, a position
$\overline{X}_p$
in a three dimensional space of a point that is to be mapped to a pixel
$\overline{P}'_{out}$
and is on the above described reference plane is calculated. Hereinafter, the height of the reference plane is denoted by Zbase. The position
$\overline{X}_p$
can be obtained by the following expressions (2) to (5):

$$\tilde{X}_p = \tilde{X}_{out} + r\tilde{X}_{pixel} \quad (2)$$

$$\tilde{X}_{pixel} = (\tilde{X}_{d,out}, \tilde{Y}_{d,out}, \tilde{Z}_{d,out}) \begin{pmatrix} \tilde{q}_{out,c} \\ 1/\tan\theta_{v,out} \end{pmatrix} \quad (3)$$

$$r = \frac{z_{base} - X_{p,z}}{X_{pixel,z}} \quad (5)$$

where Xp,z and Xpixel,z are z components of
$\overline{X}_p$
and
$\overline{X}_{pixel}$ In step S1703, in a c-th camera (hereinafter, referred to as camera c), an ideal pixel position
$\overline{X}_p$
where
$\overline{P}'_{p,c}$
is mapped is calculated.

The actual objects have heights that differ with each other. However, in the present exemplary embodiment, in order to simplify the processing, it is assumed that the height of the object is the height of the reference plane.

The ideal pixel position (ideal coordinate) in the present exemplary embodiment is a pixel position in a state the video of the camera c has no aberration such as a distortion, a chromatic aberration of magnification, or the like. The ideal pixel position
$\overline{P}'_{p,c}$
can be obtained by the following expressions (6) to (9):

$$\tilde{p}'_{p,c} = \tilde{p}_{center,c} + \begin{pmatrix} (w/2)X_{p,c,x}/X_{p,c,z}/\tan\theta_{h,c} \\ -(h/2)X_{p,c,y}/X_{p,c,z}/\tan\theta_{v,c} \end{pmatrix} \quad (6)$$

$$\tilde{X}_{p,c} = M\begin{pmatrix} \tilde{X}_p \\ 1 \end{pmatrix} \quad (7)$$

$$M = [R, 'R\tilde{X}_c] \quad (8)$$

$$'R = [\tilde{X}_{d,c}, \tilde{Y}_{d,c}, \tilde{Z}_{d,c}] \quad (9)$$

In the expressions (6), Xp,c,x, Xp,c,y, and Xp,c,z are x, y, z components of
$\overline{X}_{p,c}$
and θh,c, and θv,c are a horizontal half angle of view and a vertical half angle of view of the virtual camera c, respectively. In the expression (8),
$\overline{X}_c$
is the position of the camera c. In the expression (9),
$\overline{X}_{d,c}$
$\overline{Y}_{d,c}$
$\overline{Z}_{d,c}$
are direction vectors indicating the upper direction, the right direction, and the direction of the camera c in the video of the camera c respectively. The length of each vector is set to one. A sequence of the operation includes three transformation operations, referred to as view transformation, projection transformation, and screen transformation.

In step S1704, considering the distortion and the chromatic aberration of magnification of the camera c, the ideal pixel position
$\overline{P}'_{p,c}$
is transformed into a real pixel position (real coordinate),
$\overline{P}_{p,c,i}$
for each color. In the expression, a subscript i is an index for each color. The operation can be formally expressed by the following expression (10):

$$\overline{P}_{p,c,i} = \overline{f}_{c,i}(\overline{P}'_{p,c}) \quad (10)$$

A specific expression of the transformation depends on the optical system of the camera c to be used. Thus, generally, the transformation cannot be expressed by a simple function. Therefore, based on an actual measurement value, the transformation is performed by referring to a table.

In step S1705, a pixel position Ip,c,i at the pixel position
$\overline{P}_{p,c,i}$
of the camera c is calculated. The pixel position
$\overline{P}_{p,c,i}$
includes a decimal fraction. Accordingly, using a bicubic interpolation, or the like, a pixel value interpolated from peripheral pixels is acquired.

In step S1706, a factor Dp,c,i for adding an effect of decrease in marginal illumination to the virtual viewpoint video while correcting the decrease in marginal illumination of the camera c is calculated. As described in the following expression (11), the factor is defined as a ratio of an amount Cp of the effect of the decrease in light amount of the virtual viewpoint video (a correction amount corresponding to the characteristics of the decrease in marginal illumination of the virtual camera) to a correction amount Cp,c,i of the decrease in marginal illumination of the camera c (a correction amount corresponding to the characteristics of the decrease in marginal illumination of the camera c) at the pixel position
$\overline{P}_{p,c,i}$ $$D_{p,c,i} = C_p/C_{p,c,i} \quad (11)$$

Similarly to the distortion correction, generally, the correction amount Cp,c,i of the decrease in marginal illumination of the camera c cannot be expressed by a simple function. Therefore, a correction table is created based on an actual measurement value, and the correction is performed by referring to the table. The operation is expressed by the following expression (12):

$$C_{p,c,i} = g_i(\overline{P}_{p,c,i} \cdot I_{c,i}(\overline{P}_{p,c,i})) \quad (12)$$

As described in the expression, the correction also considering a dependency of the pixel values of the decrease in marginal illumination is performed.

The effect of the decrease in marginal illumination to be added to the virtual viewpoint video is, for example, expressed by the following expression (13):

$$C_p = (1-\beta|\overline{P}_{out} - \overline{P}_{out,center}|^4) \quad (13)$$

Then, a pixel value Iout,i of the virtual viewpoint video is calculated by the expression (14). In the expression, β is a parameter for controlling the intensity of the decrease in marginal illumination.

$$Iout,i = Dp,c,i * Ip,c,i \quad (14).$$

By the processing to step S1706, the pixel value Iout,i of a color i at the pixel position
$\overline{P}_{out}$
of the virtual viewpoint video can be defined. Until all pixels in the virtual viewpoint video are processed, processing from step S1701 to step S1707 is repeated (step S1707).

In some cases, the pixel position calculated in step S1704 becomes a coordinate outside the region of the shot image. This happens when a cover rate, which is described below, is not 100%. To solve the problem, in step S1708, with respect to a part whose calculated pixel position is outside the region of the shot image, processing is performed by displaying a predetermined image. In the present exemplary embodiment, a perspective transformation is performed to an image (texture image) of the floor surface 102 that is provided in advance corresponding to a virtual viewpoint, and combined. By using the pixel value obtained by referring to the outside of the shot image as the pixel value of the texture image after the perspective transformation, an output image without strangeness can be obtained.

By the above described processing, the virtual viewpoint video can be generated.

In the present exemplary embodiment, to make the virtual viewpoint image look as if the image was shot by a camera, both of the distortion characteristics and the characteristics in the decrease in marginal illumination set to the virtual camera are reflected onto the virtual viewpoint video. However, whether to perform the processing corresponding to the distortion characteristics and the characteristics in the decrease in marginal illumination set to the virtual camera to the virtual viewpoint video can be switched depending on an instruction by the user.

<Camera Selection Processing>

Figure 18A:
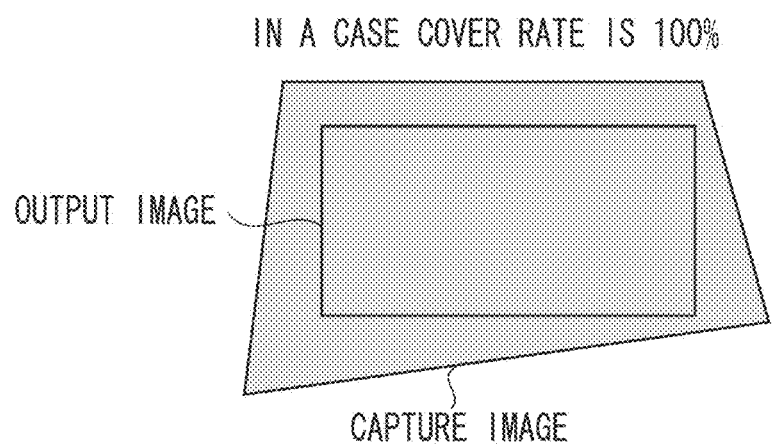
FIGS. 18A and 18B illustrate cover rates.
Figure 18B:
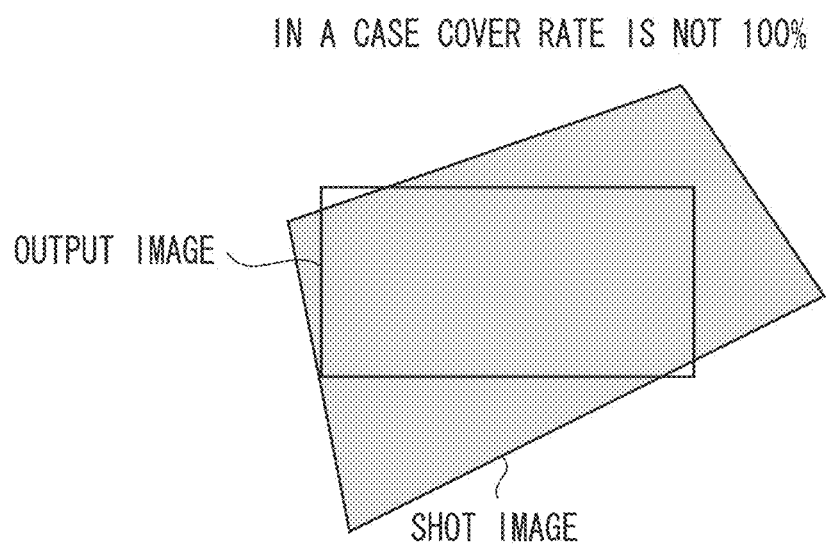

In the camera selection processing (step S1408), a camera is selected based on a cover rate with respect to a shooting camera that is operating properly. FIGS. 18A and 18B illustrate the cover rates. The cover rate is a percentage of an output image generated in the virtual viewpoint video generation processing covered with an image shot by the camera. Accordingly, the cover rate is calculated based on the height of the reference plane of the target frame. In FIG. 18A, a shot image covers all pixels of an output image. Thus, the cover rate is 100%. On the other hand, in FIG. 18B, a part of an output image is not covered with a shot image. In this case, the cover rate is less than 100%.

Figure 19:
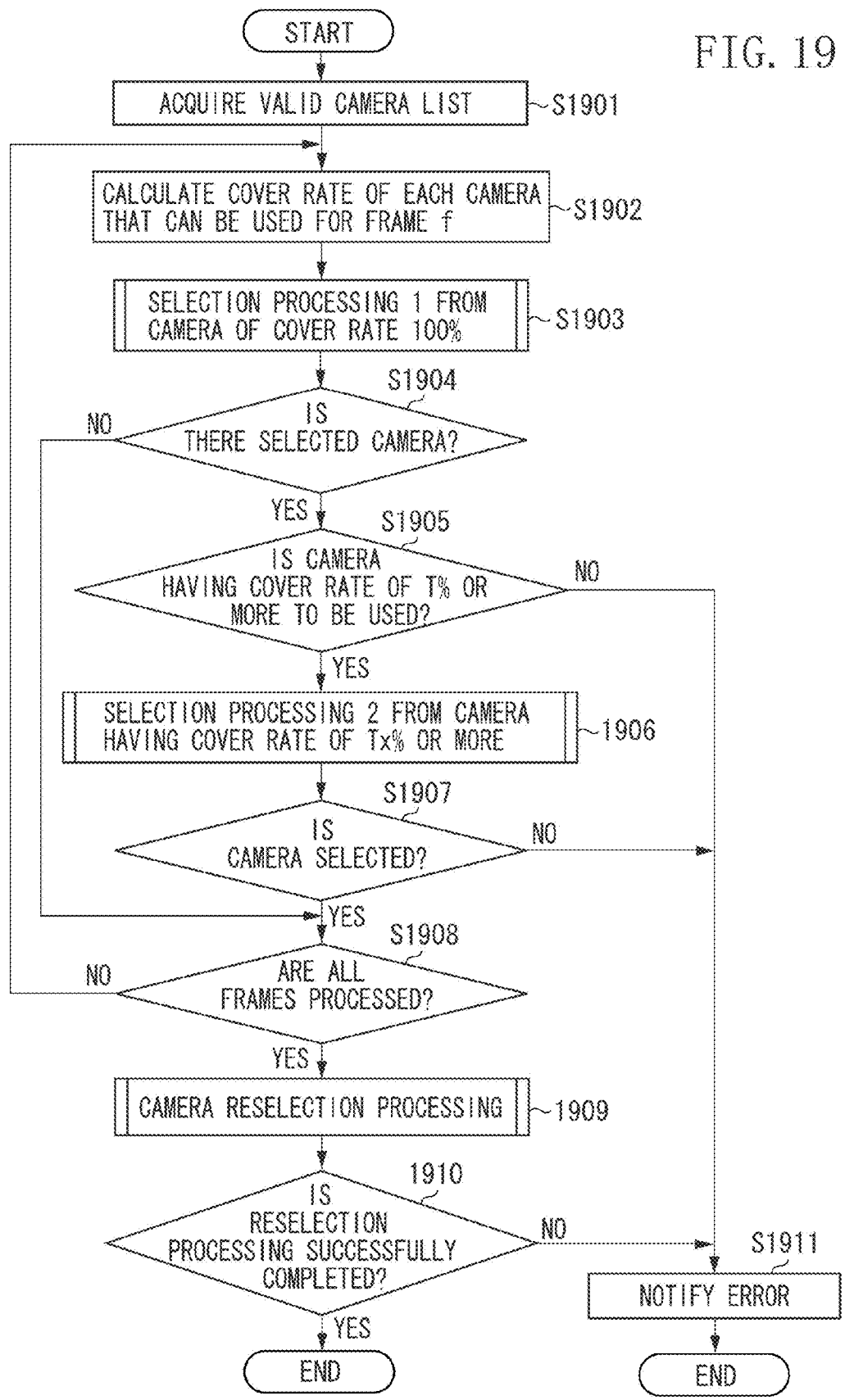
FIG. 19 is a flowchart illustrating camera selection processing.

FIG. 19 is a flowchart illustrating the flow of the camera selection processing. First, in step S1901, a valid camera list is acquired. The valid camera list is a list of the shooting cameras that are properly operating in combination with the capture PCs. The valid camera list can be acquired in the valid determination processing of the PC or the camera described with reference to FIG. 14.

Then, in step S1902, based on the virtual viewpoint, information of the target frame described in the scenario illustrated in FIG. 6A, the cover rate of each camera registered in the valid camera list is calculated. In step S1903, selection processing 1 is performed on the camera whose cover rate is 100%.

In step S1904, whether the camera is selected by the selection processing 1 is determined. If no camera is selected by the selection processing 1 (NO in step S1904), in steps S1905 and S1906, selection processing 2 is performed according to a selection processing mode setting. The selection processing mode is a setting for determining whether the camera whose cover rate is not 100% is to be a selection target. If the camera is determined as the selection target, a threshold Tx (%) is specified.

The selection processing 1 and the selection processing 2 are described in detail below. If no camera is selected also in the selection processing 2, and if no camera is selected in the selection processing 1 and a mode which does not regard the camera whose cover rate is not 100% as the selection target is set as the selection processing mode, in step S1911, an error is notified and the processing ends. The processing performed in step S1902 to step S1907 is repeated until the processing is performed to all frames (NO in step S1908).

If a camera is selected for each of the all frames (YES in step S1908), then in step S1909, camera reselection processing is performed based on a correspondence relationship between each frame and the selected camera.

For example, if transmission processing from a certain capture PC continues for a long time, the transmission processing of video data of one frame exceeds $\frac{1}{30}$ second. Then, real-time screening cannot be performed. Moreover, if the selected camera is frequently switched, an image quality between the frames also changes due to the switching, and the switching may cause a flicker in the video being screened. Accordingly, while the frequency of the switching of the cameras is reduced as much as possible, the camera selection is to be performed such that a request to a certain camera is not continued for a long time. The reselection processing is described in detail below.

If an error occurred in the reselection processing, in step S1911, the error is notified and the processing ends. When the error is notified in the camera selection processing, it is determined that an appropriate image quality cannot be obtained for the normal screening. Then, in step S1411, the screening is automatically switched to the backup screening.

Figure 20:
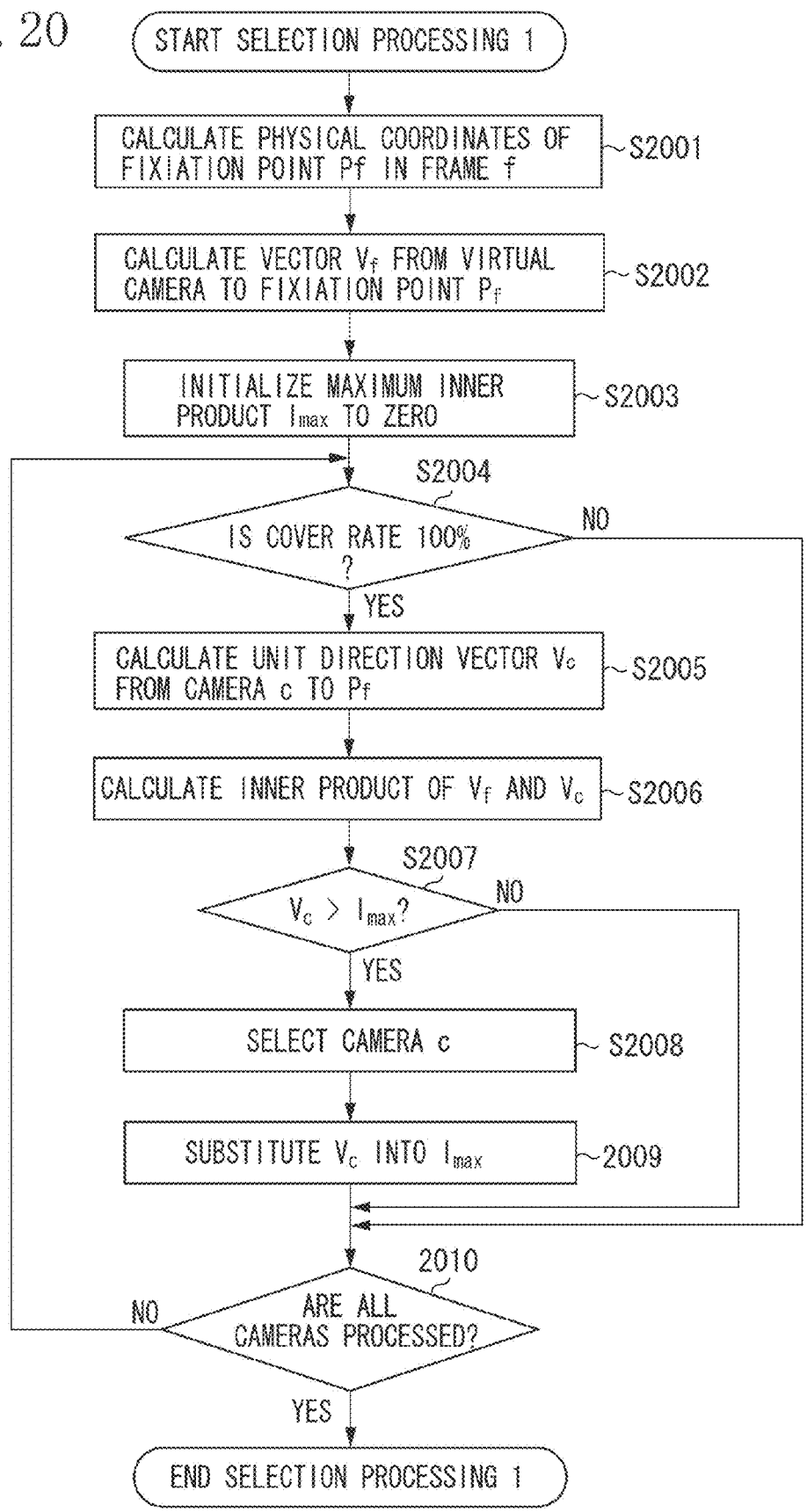
FIG. 20 is a flowchart illustrating camera selection processing 1.

FIG. 20 is a flowchart illustrating the flow of the selection processing 1 in FIG. 19. First, in steps S2001 and S2002, a physical, coordinate of a fixation point Pf in a target frame f and a vector Vf from a virtual viewpoint in a virtual camera in the target frame f described in the scenario illustrated in FIG. 6A to the fixation point Pf is calculated. In step S2003, a maximum inner product Imax is initialized to zero.

In step S2004, from the cameras registered in the valid camera list, the camera whose cover rated is 100% is detected. Then, to the camera whose cover rate is 100%, the following processing is performed.

First, in step S2005, a unit direction vector Vc from the camera c to the fixation point Pf is calculated. In step S2006, an inner product of the vector Vc and the vector Vf is calculated. In steps S2007 to S2009, a camera c that has a maximum inner product is selected. More specifically, a camera whose position and orientation of the viewpoint is close to the position and orientation of the virtual viewpoint in the target frame f is selected.

As described above, in the selection processing 1, from the cameras whose cover rates are greater than a certain rate (in the present exemplary embodiment, 100%), the most appropriate camera is selected based on the positional relationship between the virtual viewpoint information of the frame and the camera viewpoint information of the plurality of cameras.

Figure 21:
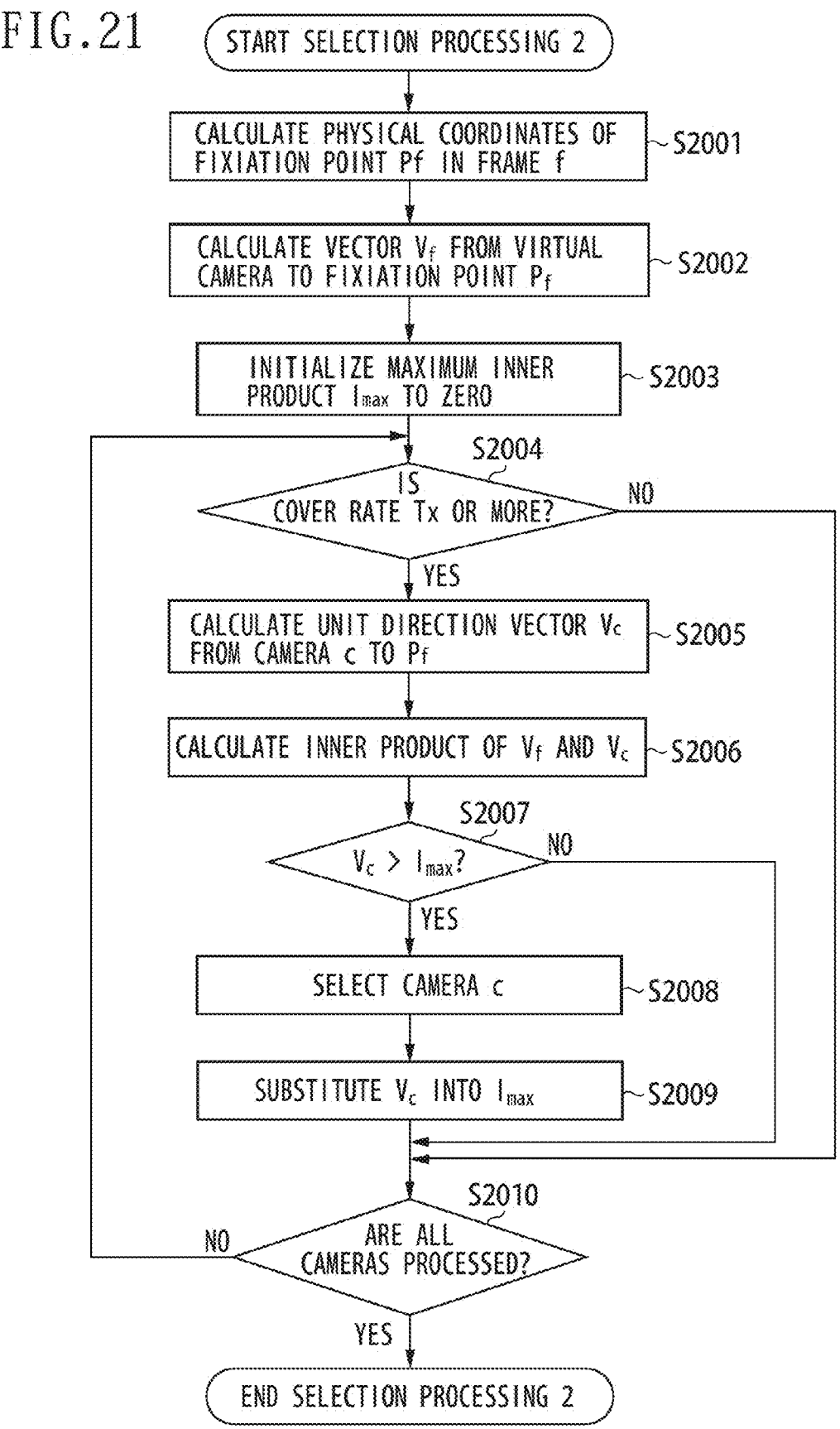
FIG. 21 is a flowchart illustrating camera selection processing 2.

FIG. 21 is a flowchart illustrating the flow of the selection processing 2 in FIG. 19. Regarding the processing similar to that in the flowchart in FIG. 20, the same reference number is applied and its description is omitted. In the selection processing 2, in step S2104, cameras whose cover rates are greater than Tx (%) are detected. From the detected cameras, a camera which is on a position closest to the viewpoint from the virtual camera is selected.

Figure 22A:
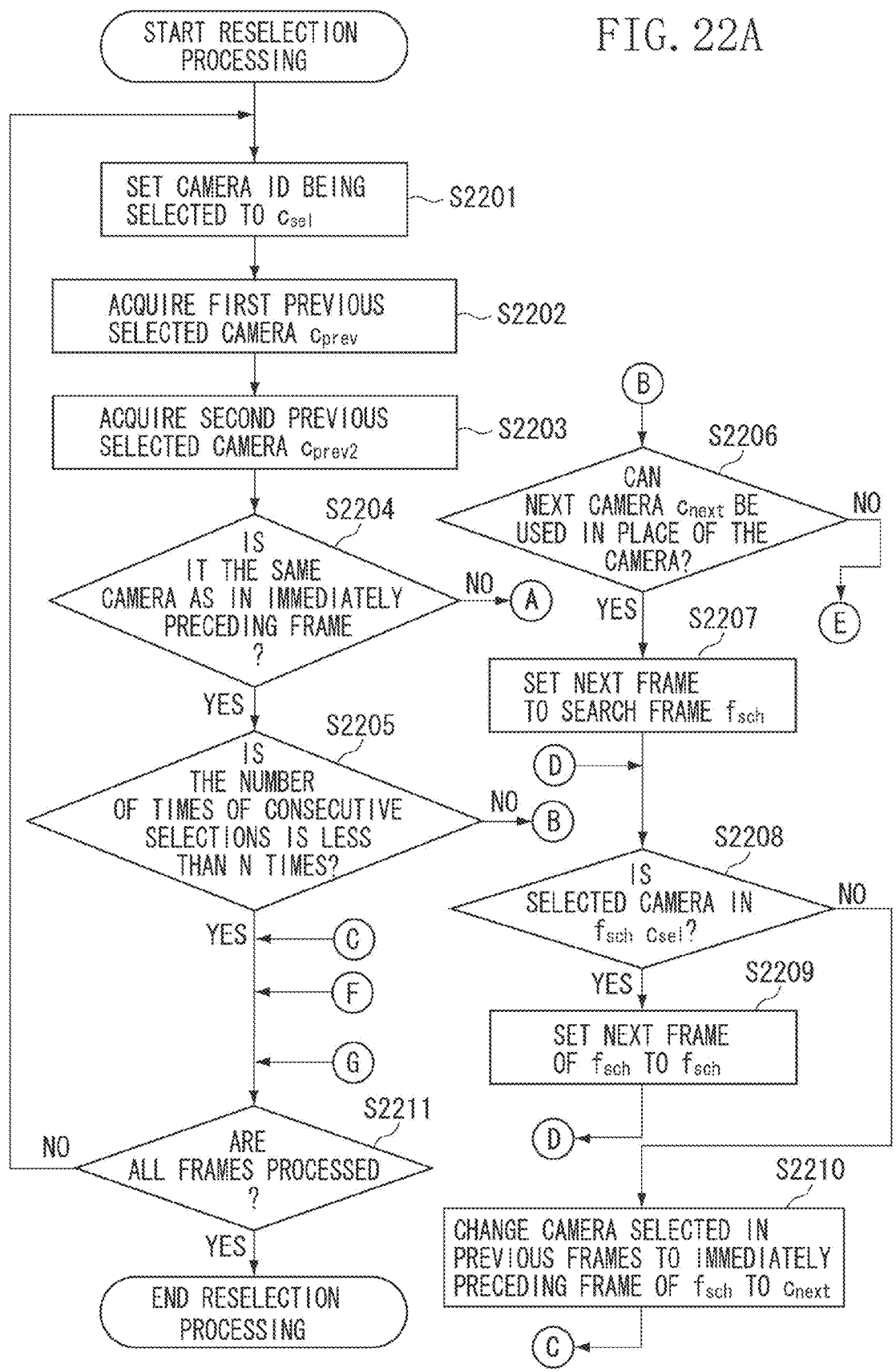
FIGS. 22A and 22B are a flowchart illustrating camera reselection processing.
Figure 22B:
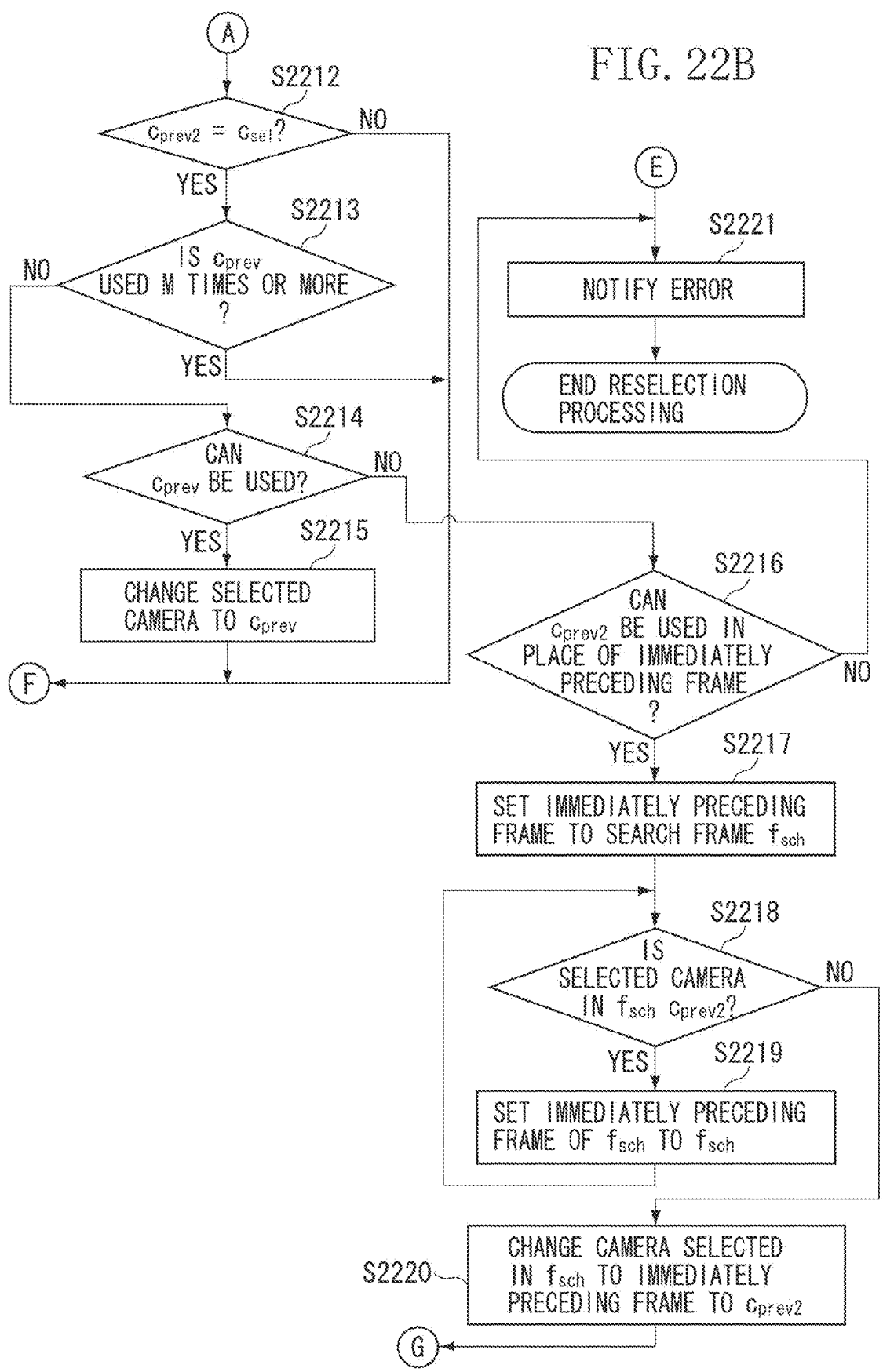

FIGS. 22A and 22B are a flowchart illustrating the flow of the reselection processing (step S1909) in FIG. 19. In the screening system according to the present exemplary embodiment, the cameras are installed along the moving route of the virtual viewpoint. Accordingly, the cameras are sequentially switched and used to generate a virtual viewpoint video.

First, in step S2201, a camera selected in the target frame is defined as a camera c_sel. Then, in step S2202, a first previous selected camera c_prev is acquired. The first previous selected camera is not a camera that is selected in an immediately preceding frame, the camera different from the camera c_sel selected in a previous frame before the target frame, and the camera that was selected first previously from the camera currently being selected.

Similarly, in step S2203, a second previous selected camera c_prev2 is acquired. In step S2204, whether the camera of the target frame is the same camera as of the first previous frame (immediately preceding frame) is checked. Depending on whether the same camera as in the immediately preceding frame is selected, processing to be performed differs.

(a) In a case where the same camera as in the immediately preceding frame is selected.

In this case, camera selection processing considering the number of times of consecutive selection is performed. In the present exemplary embodiment, an upper limit of the number of times of consecutive selection is set to N. In step S2205, if the number of times of consecutive selection is less than N times (YES in step S2205), the current camera is still to be selected without change. If the number of times of consecutive selection is greater than or equal to N times (NO in step S2205), then in step S2206, whether a camera c_next that is to be next selected camera in the scenario can be used in place of the camera is checked. Whether the camera is substitutable is determined based on the cover rate. If the camera is substitutable (YES in step S2206), in steps S2207 to S2210, with respect to a frame in which the camera c_sel is consecutively selected, the selected camera is changed to the camera c_next from frames after the frame currently being processed. If the camera is not substitutable (NO in step S2206), then in step S2221, an error is notified and the processing ends.

(b) In a case where a camera different from the camera in the immediately preceding frame is selected.

In this case, camera selection processing considering the frequency of camera switching is performed. First, in step S2212, whether the camera c_sel being selected is the same as the camera c_prev2 that is second previous selected camera. If the camera is the same (YES in step S2212), there is a possibility that the camera c_sel and the camera c_prev are alternatively switched as the selected camera. Thus, processing for preventing the state in which the camera c_sel and the camera c_prev are alternatively switched is performed.

In step S2213, whether the camera c_prev is consecutively used M times or more at the step of the immediately preceding frame is checked. If the camera c_prev is not consecutively used M times or more (NO in step S2213), there is a possibility that the frequency of camera switching has become high. Thus, in step S2214, whether the camera c_prev can be used in place of the camera c_sel is checked.

If the camera c_prev can be used in place of the camera c_sel (YES in step S2214), in step S2215, the selected camera is changed to the camera c_prev. If the camera c_prev cannot be used in place of the camera c_sel (NO in step S2214), in step S2216, the camera c_prev2 is tried to be used in place of the camera c_sel to the immediately preceding frame.

If the camera c_prev2 can be used in place of the camera c_sel (YES in step S2216), in steps S2217 to S2220, the selected cameras in the all_frames that consecutively select the camera c_prev are changed to the camera c_prev2 in the frames before the immediately preceding frame.

The above described processing is repeated until the processing is performed to all frames (NO in step S2211).

On the other hand, if the camera c_prev2 cannot be used in place of the camera c_sel (NO in step S2216), in step S2221, an error is notified and the processing ends. If the error is notified in the reselection processing, in steps S1910 and 1911, the screening is automatically switched to the backup screening.

In the camera reselection processing described in the present exemplary embodiment, as a result of the application of the processing (b), the number of times of consecutive selection can become N times or more. Accordingly, by checking the number of times of the consecutive selection after the processing, and performing processing similar to the processing (a), the above described state can be prevented.

According to the above described camera selection processing, if failure occurs in a part of the shooting cameras or the capture PCs, the screening can be performed without problem. Especially, if the camera selection processing considering the image quality is performed and an appropriate image quality cannot be obtained, by automatically switching to the backup screening, the system that can continue screening for a long time can be provided.

In the virtual viewpoint video generation processing, it is assumed that the height of the object is the height of the reference plane. Accordingly, if the camera is switched, positions of the object may be discontinuously changed between frames. By the reselection processing, the camera of the target frame can be reselected such that the number of times of the switching of the camera is reduced. Accordingly, a smooth free viewpoint video can be generated.

In the first exemplary embodiment, all pieces of the image data acquired by the shooting camera are transmitted. However, if the angle of view specified by the scenario to the angle of view of the shooting camera is narrow, it is not necessary to transmit all pieces of the image data. In a second exemplary embodiment, before the image data is transmitted from the capture PC to the image processing PC, it is determined that which part of the shot image is necessary, and only the minimum part is transmitted.

Figure 23:
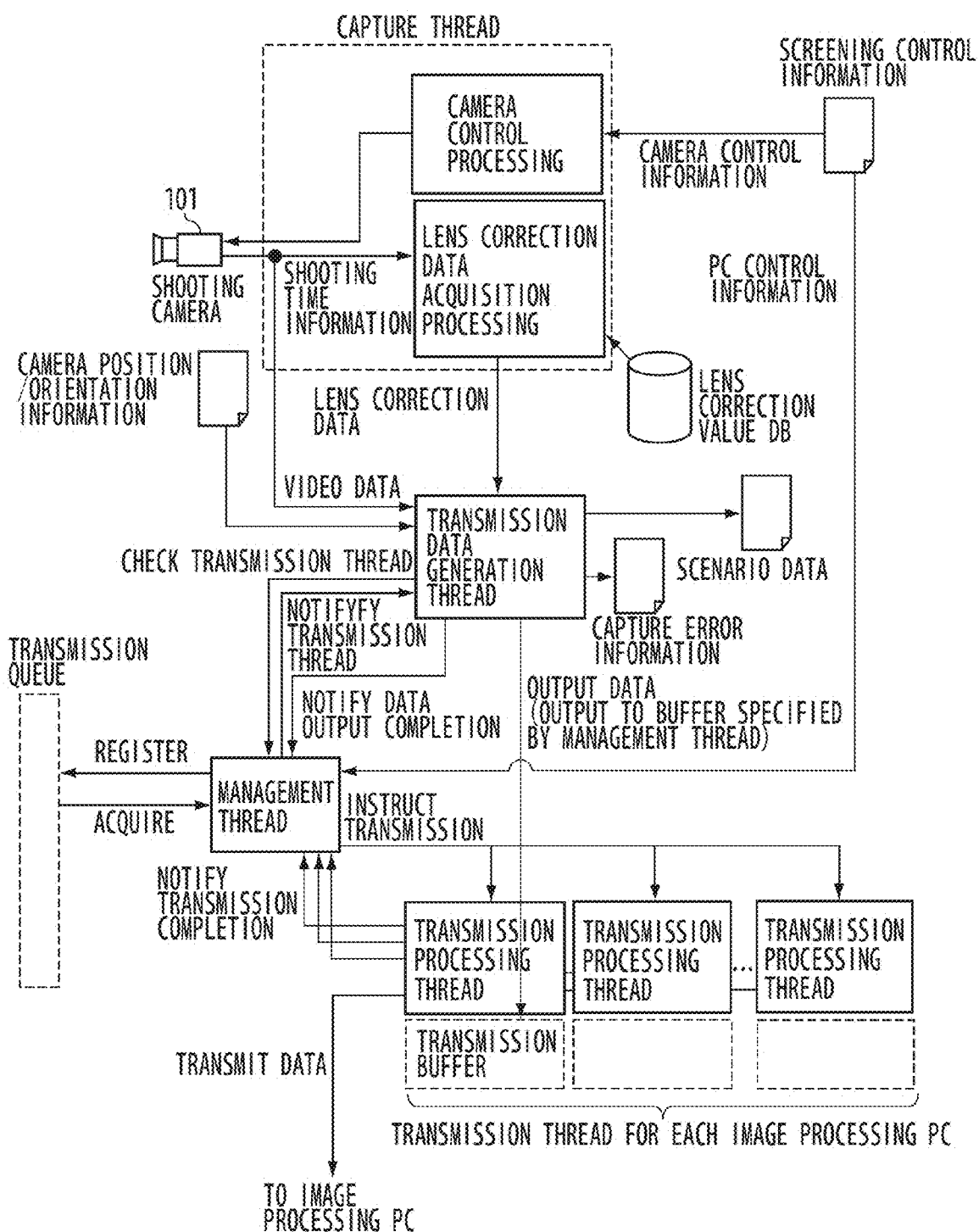
FIG. 23 is a schematic view illustrating processing in a capture PC according to a second exemplary embodiment.

FIG. 23 is a schematic view illustrating the processing in the capture PC according to the second exemplary embodiment. As described in the virtual viewpoint video generation processing according to the first exemplary embodiment, by using the scenario data, it is determined that which part in the shot image data is necessary (transmission region determination processing).

Figure 24:
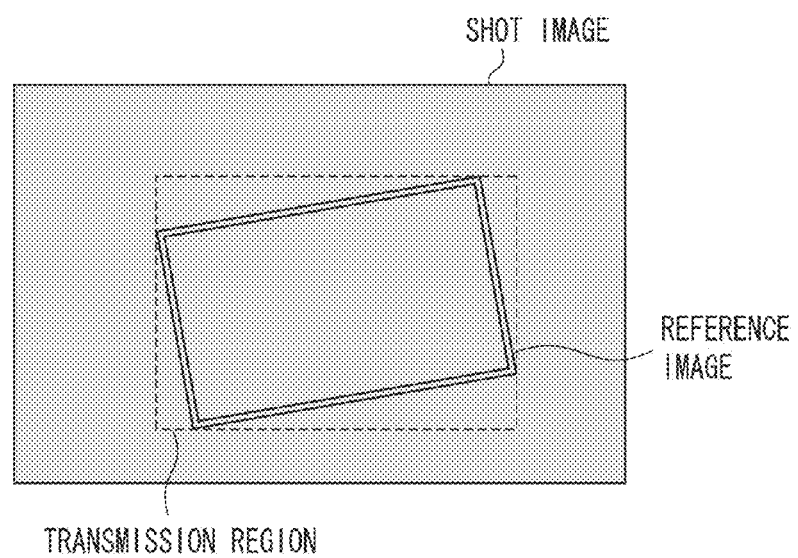
FIG. 24 illustrates a transmission region according to the second exemplary embodiment.

The transmission region determination processing is performed as described below. Similarly to the virtual viewpoint video generation processing, a reference pixel position of the shot image is calculated. However, the processing is not applied to all pixels of an output image but applied only to pixels adjacent to the four sides of the output image. In the reference pixels acquired as a result of the processing, a region defined by a maximum value and a minimum value of the coordinates in the horizontal direction and a maximum value and a minimum value of the coordinates in the vertical direction, for example, as illustrated in FIG. 24, is defined as the transmission region.

Figure 25:
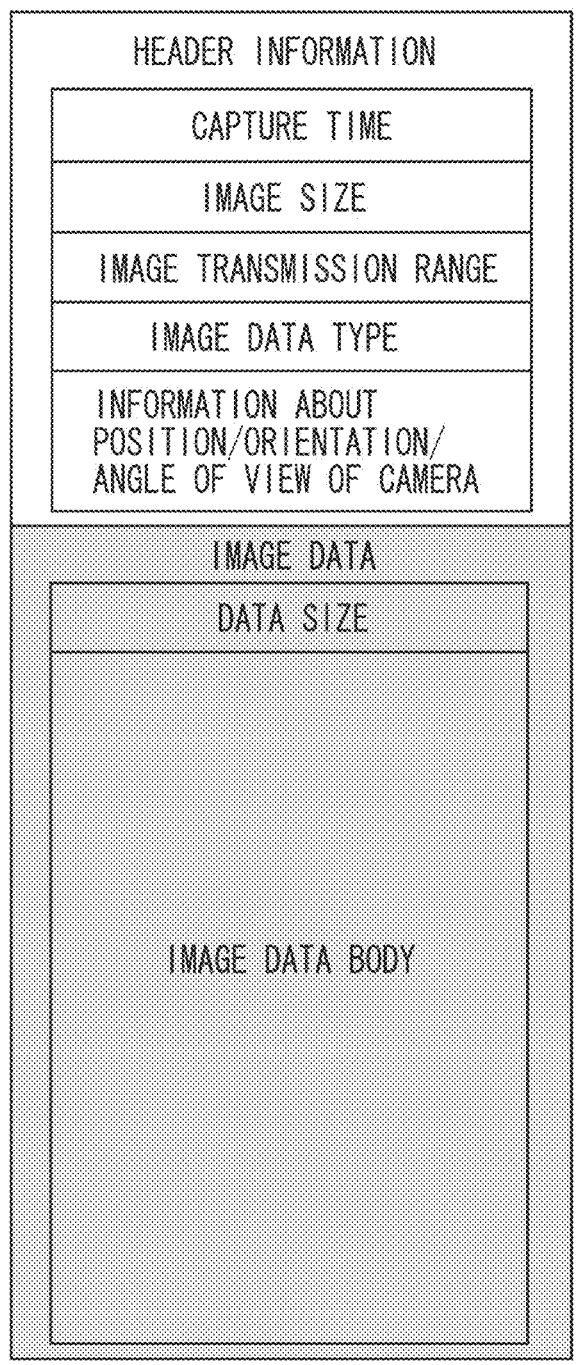
FIG. 25 illustrates a format of data to be transmitted from the capture PC to the image processing PC according to the second exemplary embodiment.

As described in the first exemplary embodiment, in the virtual viewpoint video generation processing, a central position (an optical axis central position) in the shot image needs to be acquired. Accordingly, it is necessary to store information about which part (image transmission range) of the shot image corresponds to the image data to be transmitted. The data format according to the present exemplary embodiment is illustrated in FIG. 25. In the virtual viewpoint video generation processing according to the present exemplary embodiment, the pixel positions are calculated considering the image transmission range. The calculation processing is different from the processing according to the first exemplary embodiment only in that the pixel positions are offset by an amount of the coordinate of upper left in the image transmission range, and the rest of the processing is similar to that in the first exemplary embodiment. Accordingly, the description of the processing is omitted.

As described above, by using the image reproduction apparatus according to the present exemplary embodiment, the amount of data transmission can be appropriately set. As a result, the load in the network can be reduced, and the buffering time set to each PC can be shortened. By reducing the time lag from shooting to screening, the quality of user experience can be improved.

As many apparently widely different embodiments of the present invention can be made without departing from the spirit and scope thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095094 filed Apr. 16, 2010, which is hereby incorporated by reference herein in its entirety.

What is claimed is:

1. An image processing apparatus for generating virtual viewpoint video including a plurality of frames at a virtual viewpoint by using a plurality of real images at a plurality of real viewpoints obtained by a plurality of cameras comprising:
a memory;
a processor coupled to the memory which executes the following:
acquiring virtual viewpoint information given as a position and an orientation of the virtual viewpoint;
selecting a camera for shooting an image to be used in generating an image at a virtual viewpoint in a frame from a plurality of cameras with respect to each of the plurality of the frames based on a positional relationship between the virtual viewpoint information of each frame and viewpoint information of the plurality of the cameras; and
reselecting the camera selected for each of the plurality of the frames,
wherein, if a camera selected for a target frame differs from a camera selected for a preceding frame of the target frame, and if a rate of covering an image at the virtual viewpoint of the target frame with a shot image of the camera selected for the preceding frame is greater than a predetermined value, the reselecting changes the camera selected for the target frame to the camera selected for the preceding frame.

2. The image processing apparatus according to claim 1, wherein selecting a camera whose position and orientation at a viewpoint thereof is closest to a position and an orientation of the virtual viewpoint of the frame from among the cameras whose rates of covering the image at the virtual viewpoint of the target frame with the shot image of the camera are greater than the predetermined value in the plurality of the cameras selected for the preceding frame.

3. The image processing apparatus according to claim 1, wherein reselecting changes the camera selected for the target frame such that the number of times the same camera is consecutively selected is less than a predetermined value.

4. A method for image processing for generating virtual viewpoint video including a plurality of frames at a virtual viewpoint by using a plurality of real images at a plurality of real viewpoints obtained by a plurality of cameras, the method comprising:
acquiring virtual viewpoint information given as a position and an orientation of the virtual viewpoint;
selecting a camera for shooting an image to be used in generating an image at a virtual viewpoint in a frame from a plurality of cameras with respect to each of the plurality of the frames based on a positional relationship between the virtual viewpoint information of each frame and viewpoint information of the plurality of the cameras; and
reselecting the camera selected for each of the plurality of the frames,
wherein, if a camera selected for a target frame differs from a camera selected for a preceding frame of the target frame, and if a rate of covering an image at the virtual viewpoint of the target frame with a shot image of the camera selected for the preceding frame is greater than a predetermined value, the camera selected for the target frame is changed to the camera selected for the preceding frame in the reselection.

5. A non-transitory computer-readable storage medium storing a program for causing a computer to execute a method for image processing for generating virtual viewpoint video including a plurality of frames at a virtual viewpoint by using a plurality of real images at a plurality of real viewpoints obtained by a plurality of cameras, the method comprising:
acquiring virtual viewpoint information given as a position and an orientation of the virtual viewpoint;
selecting a camera for shooting an image to be used in generating an image at a virtual viewpoint in a frame from a plurality of cameras with respect to each of the plurality of the frames based on a positional relationship between the virtual viewpoint information of each frame and viewpoint information of the plurality of the cameras; and
reselecting the camera selected for each of the plurality of the frames,
wherein, if a camera selected for a target frame differs from a camera selected for a preceding frame of the target frame, and if a rate of covering an image at the virtual viewpoint of the target frame with a shot image of the camera selected for the preceding frame is greater than a predetermined value, the camera selected for the target frame is changed to the camera selected for the preceding frame in the reselection.

* * * * *